(12) United States Patent
Guim Bernat et al.

(10) Patent No.: US 11,573,900 B2
(45) Date of Patent: Feb. 7, 2023

(54) PROACTIVE DATA PREFETCH WITH APPLIED QUALITY OF SERVICE

(71) Applicant: Intel Corporation, Santa Clara, CA (US)

(72) Inventors: Francesc Guim Bernat, Barcelona (ES); Slawomir Putyrski, Gdynia (PL); Susanne M. Balle, Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 573 days.

(21) Appl. No.: 16/568,048

(22) Filed: Sep. 11, 2019

(65) Prior Publication Data

US 2020/0004685 A1    Jan. 2, 2020

(51) Int. Cl.
| | | |
|---|---|---|
| *G06F 12/00* | (2006.01) | |
| *G06F 12/0862* | (2016.01) | |
| *G06F 12/0813* | (2016.01) | |
| *G06F 11/30* | (2006.01) | |

(52) U.S. Cl.
CPC ...... *G06F 12/0862* (2013.01); *G06F 11/3037* (2013.01); *G06F 12/0813* (2013.01); *G06F 2212/154* (2013.01); *G06F 2212/602* (2013.01)

(58) Field of Classification Search
CPC ............ G06F 12/0862; G06F 11/3037; G06F 12/0813; G06F 2212/154; G06F 2212/602
See application file for complete search history.

(56) References Cited

U.S. PATENT DOCUMENTS

| | | | | |
|---|---|---|---|---|
| 5,832,197 | A * | 11/1998 | Houji | H04Q 3/66 709/239 |
| 5,987,506 | A * | 11/1999 | Carter | G06F 16/9574 711/E12.066 |
| 7,487,296 | B1 * | 2/2009 | Iacobovici | G06F 9/383 712/207 |
| 7,565,494 | B1 * | 7/2009 | Todd | H04L 67/56 709/221 |
| 2002/0083299 | A1 * | 6/2002 | Van Huben | G06F 15/17381 712/21 |
| 2004/0042402 | A1 * | 3/2004 | Galand | H04L 45/28 370/242 |

(Continued)

OTHER PUBLICATIONS

Office Action for U.S. Appl. No. 17/125,443, dated Feb. 16, 2022.

*Primary Examiner* — Shawn X Gu
*Assistant Examiner* — Mohammad S Hasan
(74) *Attorney, Agent, or Firm* — Essential Patents Group, LLP.; Christopher K. Gagne

(57) ABSTRACT

Examples described herein relate to prefetching content from a remote memory device to a memory tier local to a higher level cache or memory. An application or device can indicate a time availability for data to be available in a higher level cache or memory. A prefetcher used by a network interface can allocate resources in any intermediary network device in a data path from the remote memory device to the memory tier local to the higher level cache. Memory access bandwidth, egress bandwidth, memory space in any intermediary network device can be allocated for prefetch of content. In some examples, proactive prefetch can occur for content expected to be prefetched but not requested to be prefetched.

21 Claims, 33 Drawing Sheets

(56) References Cited

U.S. PATENT DOCUMENTS

| | | | |
|---|---|---|---|
| 2004/0139374 A1* | 7/2004 | Meaney | G06F 11/0724 |
| | | | 714/48 |
| 2007/0250601 A1* | 10/2007 | Amlekar | G06F 16/9574 |
| | | | 709/219 |
| 2009/0323522 A1* | 12/2009 | Deguchi | H04L 41/08 |
| | | | 370/228 |
| 2010/0214913 A1* | 8/2010 | Kompella | H04L 45/125 |
| | | | 370/230 |
| 2011/0173396 A1* | 7/2011 | Sugumar | G06F 12/0862 |
| | | | 709/212 |
| 2011/0292949 A1* | 12/2011 | Hayashi | H04L 47/70 |
| | | | 370/419 |
| 2012/0026877 A1* | 2/2012 | Rajappan | H04L 65/752 |
| | | | 370/235 |
| 2013/0046719 A1* | 2/2013 | Sogo | G06F 8/4442 |
| | | | 706/46 |
| 2013/0205141 A1 | 8/2013 | Solihin | |
| 2016/0062894 A1* | 3/2016 | Schwetman, Jr. | H04L 67/5681 |
| | | | 711/137 |
| 2016/0119443 A1 | 4/2016 | Susarla et al. | |
| 2018/0032339 A1* | 2/2018 | Durnov | G06F 9/44521 |
| 2018/0176324 A1* | 6/2018 | Kumar | H04L 67/025 |
| 2018/0342039 A1 | 11/2018 | Kachare et al. | |
| 2020/0073464 A1 | 3/2020 | Bernat et al. | |

\* cited by examiner

PROACTIVE DATA PREFETCH WITH APPLIED QUALITY OF SERVICE

TECHNICAL FIELD

Various examples described herein relate to pre-fetching data from local or remote memory devices.

BACKGROUND

Cloud computing provides a client device with tremendous computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer. For example, low latency requirements may arise from rapid but highly informed decisions needed by autonomous driving vehicles, smart homes, image recognition technologies, voice interface technologies, video surveillance for threat detection, cyber-security, cloud services for mobile devices, industrial machines, or health monitoring system uses.

In data centers, some operations (e.g., workloads) are performed on behalf of customers by use of an accelerator device capable of performing a set of operations faster than a general purpose processor and meet the requirements (e.g., a target latency, a target number of operations per second, etc.) of a service level agreement (SLA) with the customer.

DETAILED DESCRIPTION

A critical performance and flexibility challenge faced by in-memory computing applications as their datasets grow exponentially in volume, while their time-to-result needs to shrink one hundred fold or more. However complex a query and however large the dataset over which it needs to be run, many applications and databases are now routinely expected to deliver results in near real time. This is a steep requirement, considering the tension between the four different aspects below.

Data processing operations that once used to take in the order of hours or days is now expected to be delivered in a few seconds. An approach for achieving this feat today is use of in-memory computing, where operations can run as though accessing data at cache speeds and massive numbers of central processing units (CPUs) can partition data dynamically for collaboratively progressing to a result. As data growth continues to compound at an expected 40-60 percent rate, it is not possible to keep all data in a single memory tier. Nor is it possible to keep all data in a single machine, even if a machine has terabytes of memory through a multitier organization such as HBM-DDR-AEP and so forth. The need towards scale-out arrangements is not a result of the memory capacity demand alone, but is also precipitated by the need for more computational capacity.

Figure 1:
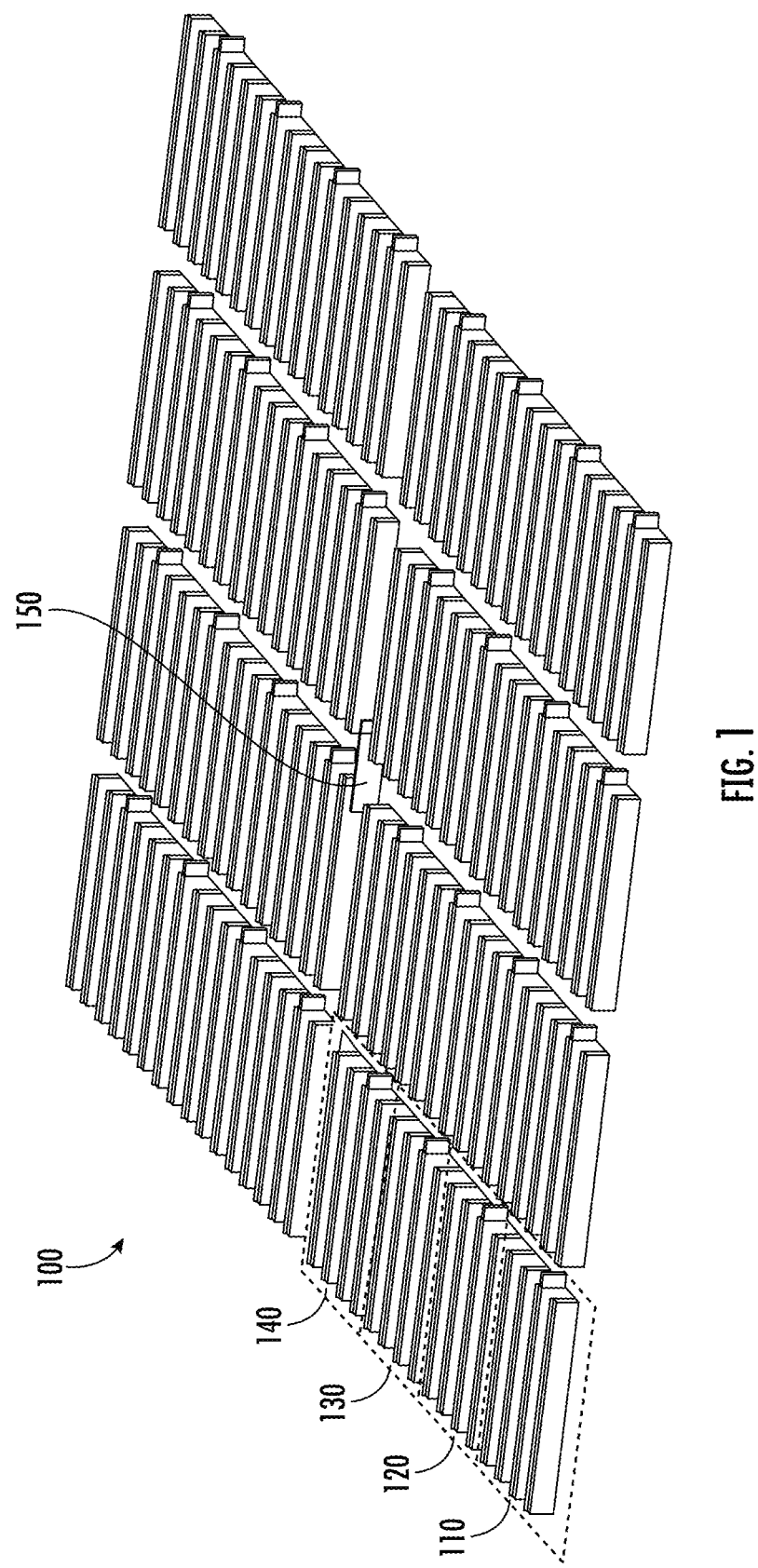
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
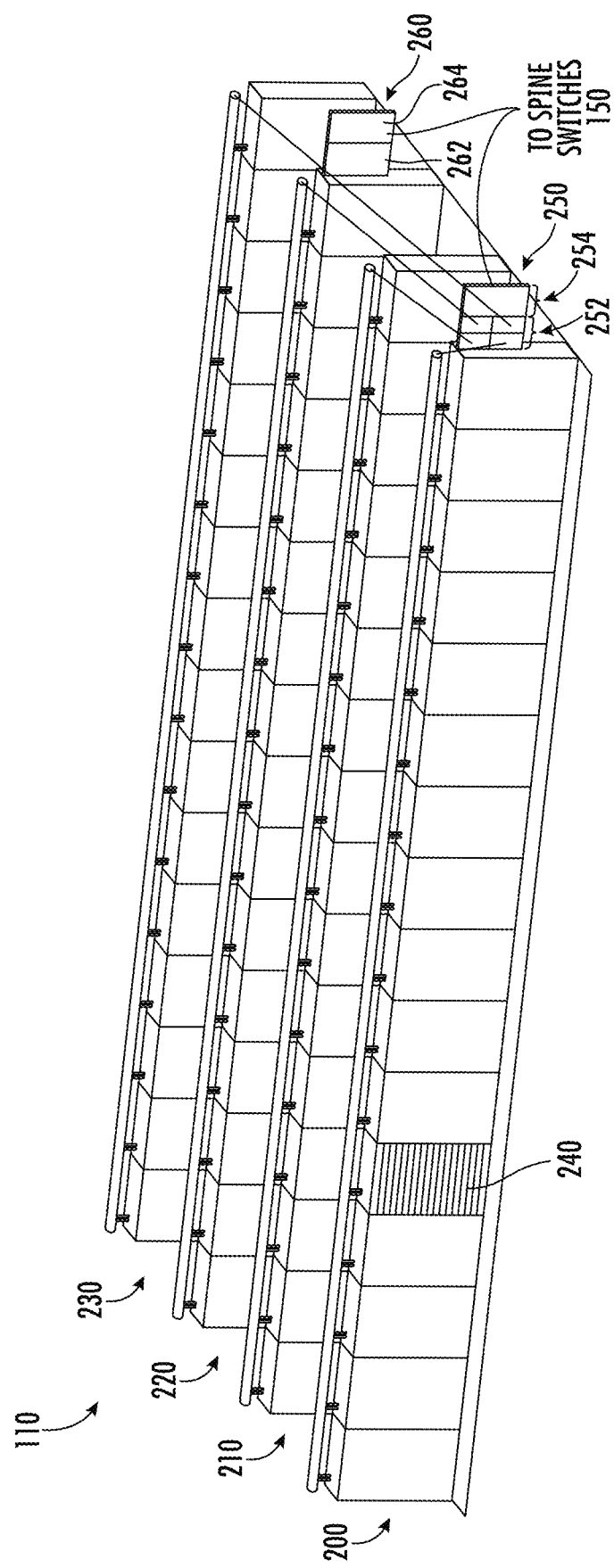
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
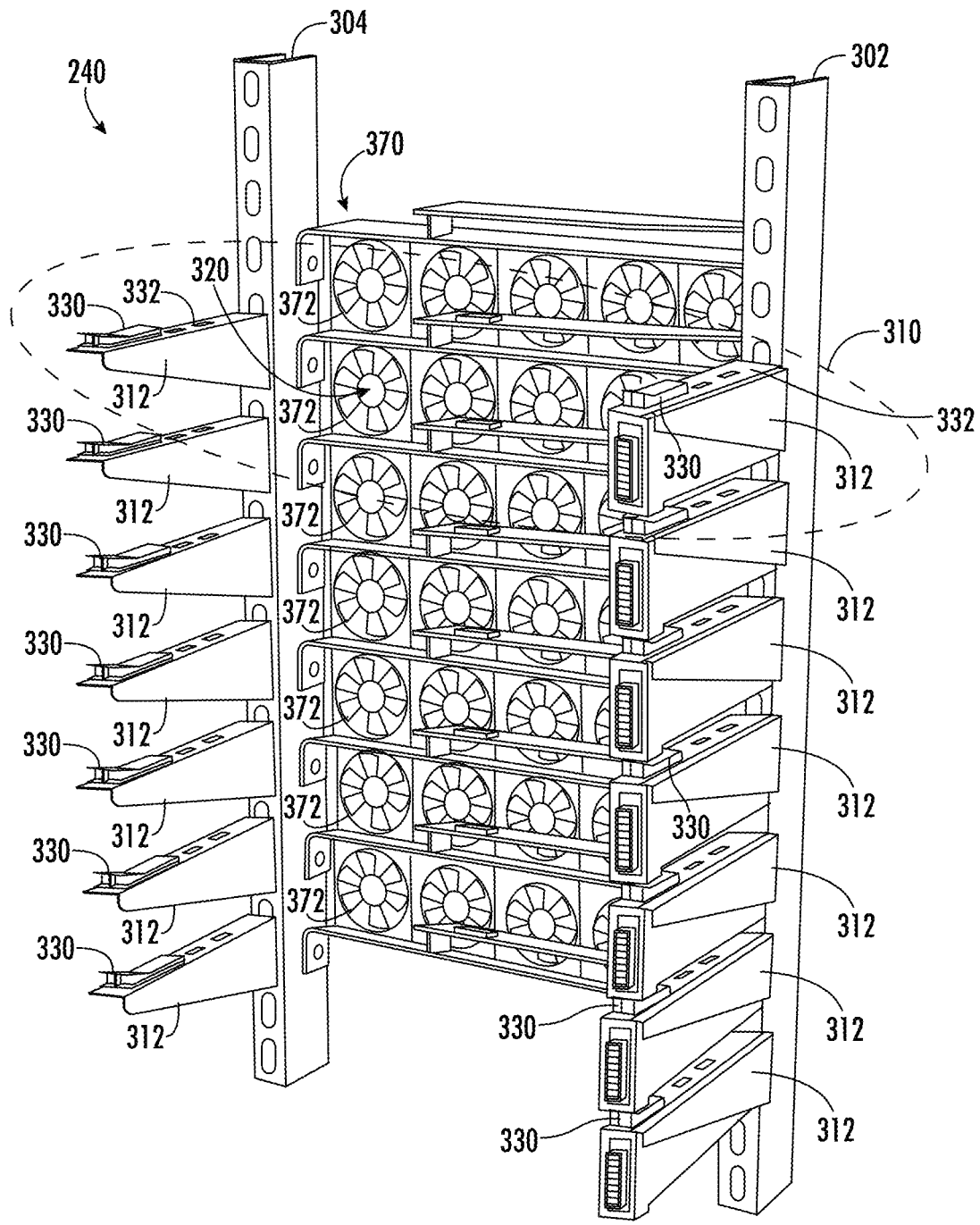
FIG. 3 is a perspective view of at least one embodiment of a rack that may be included in a pod.
Figure 4:
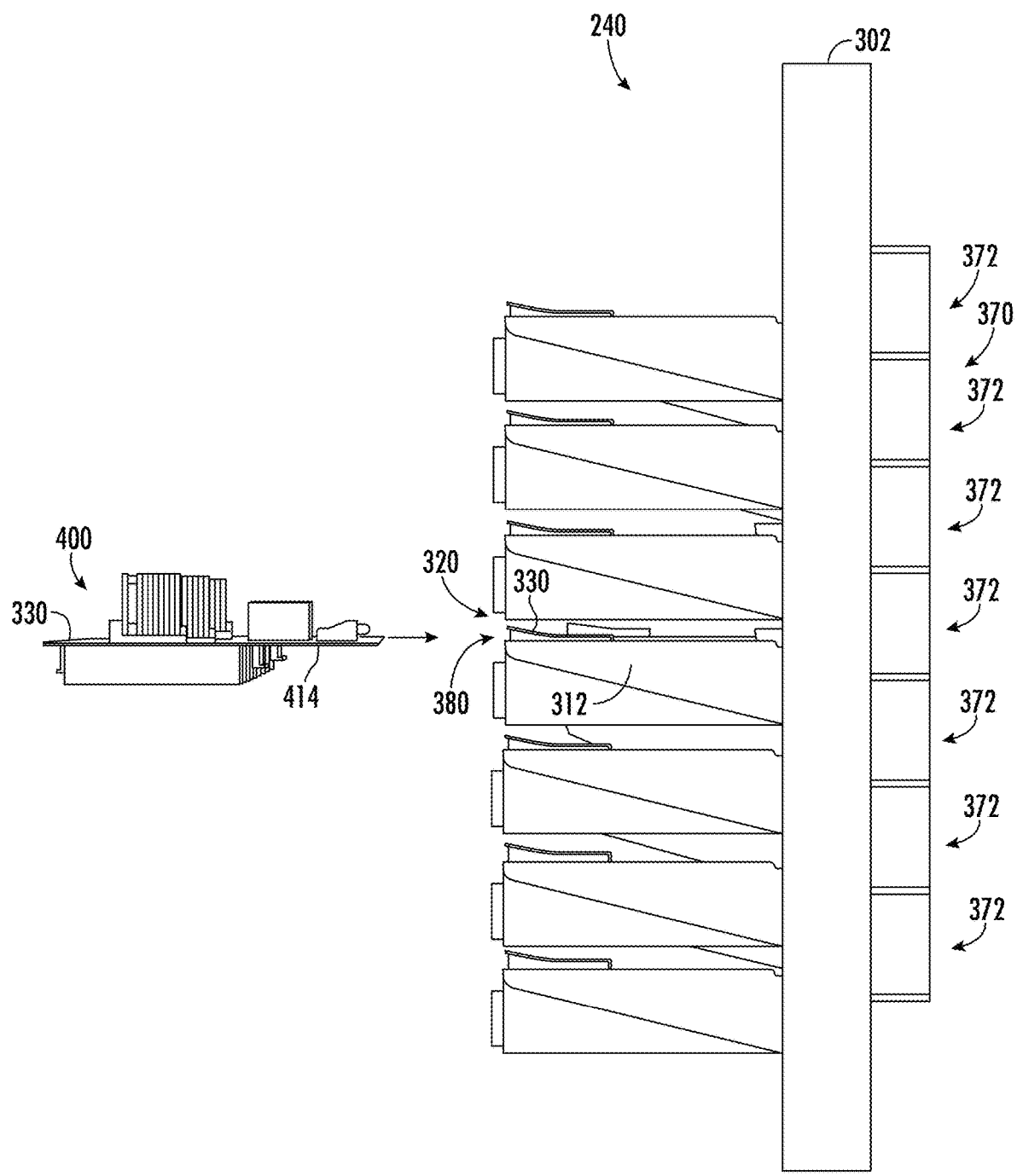
FIG. 4 is a side elevation view of a rack.
Figure 5:
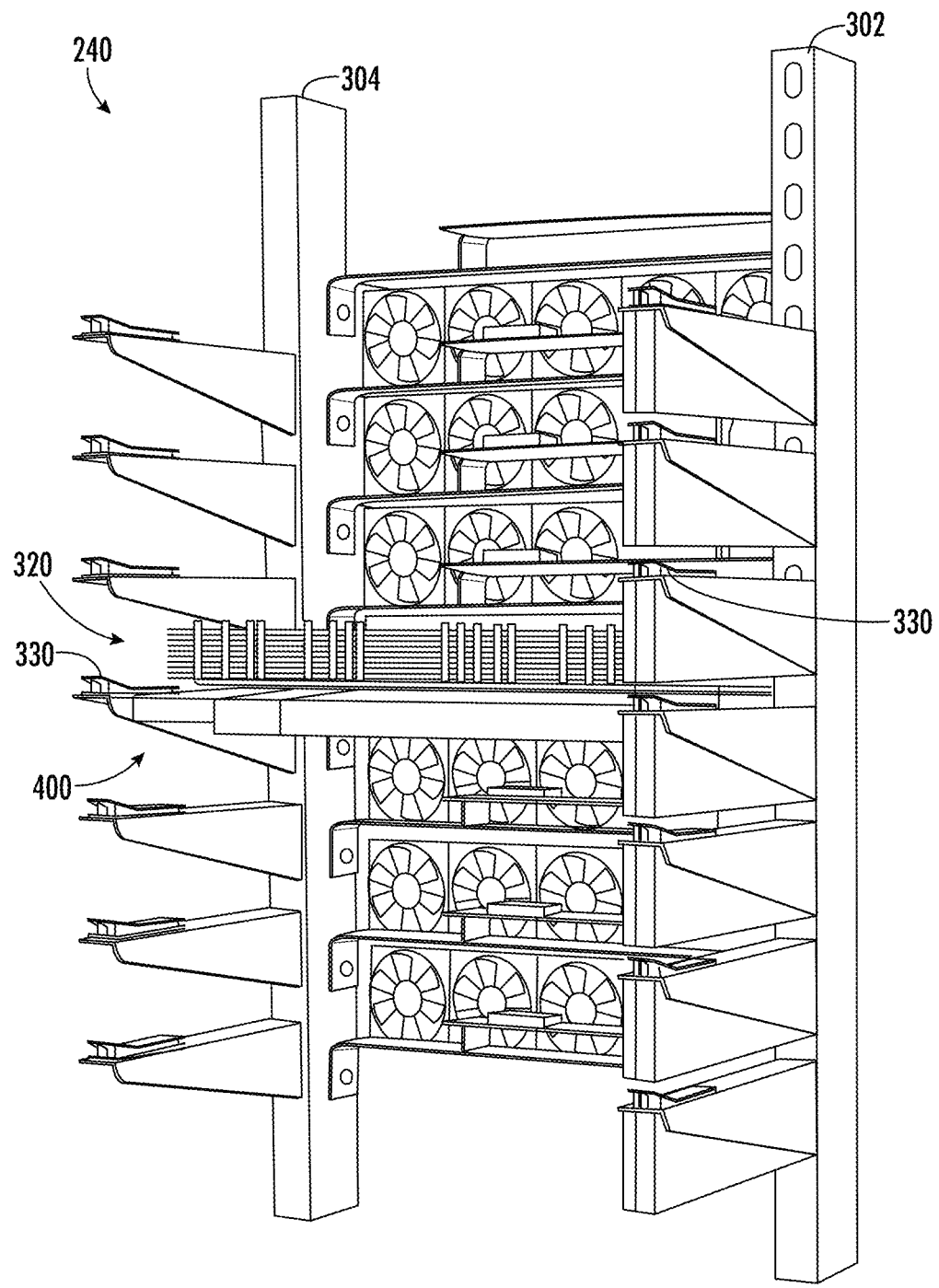
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
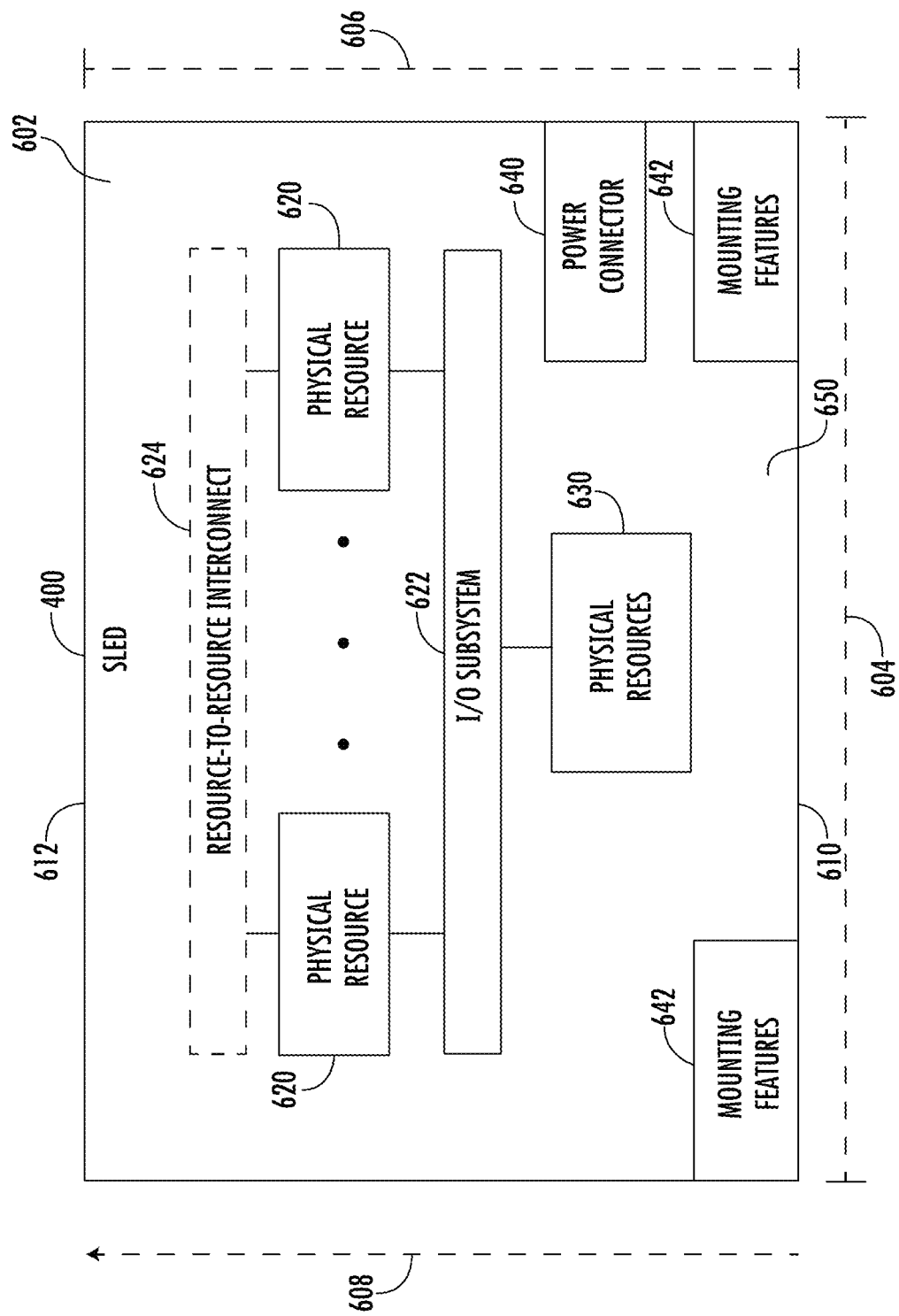
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
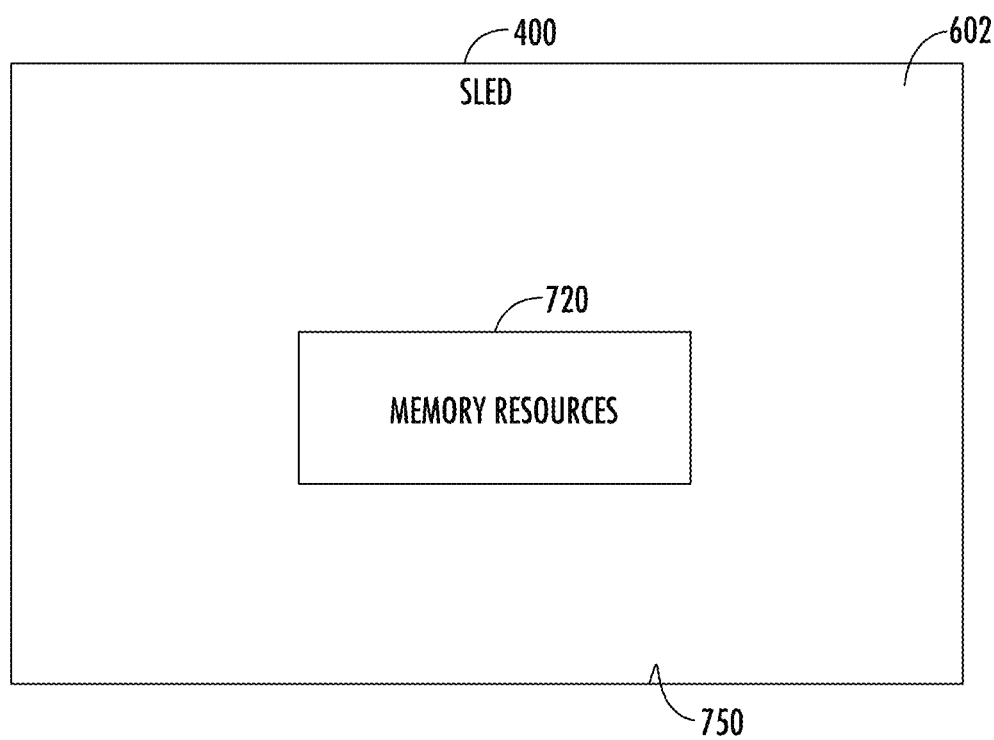
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
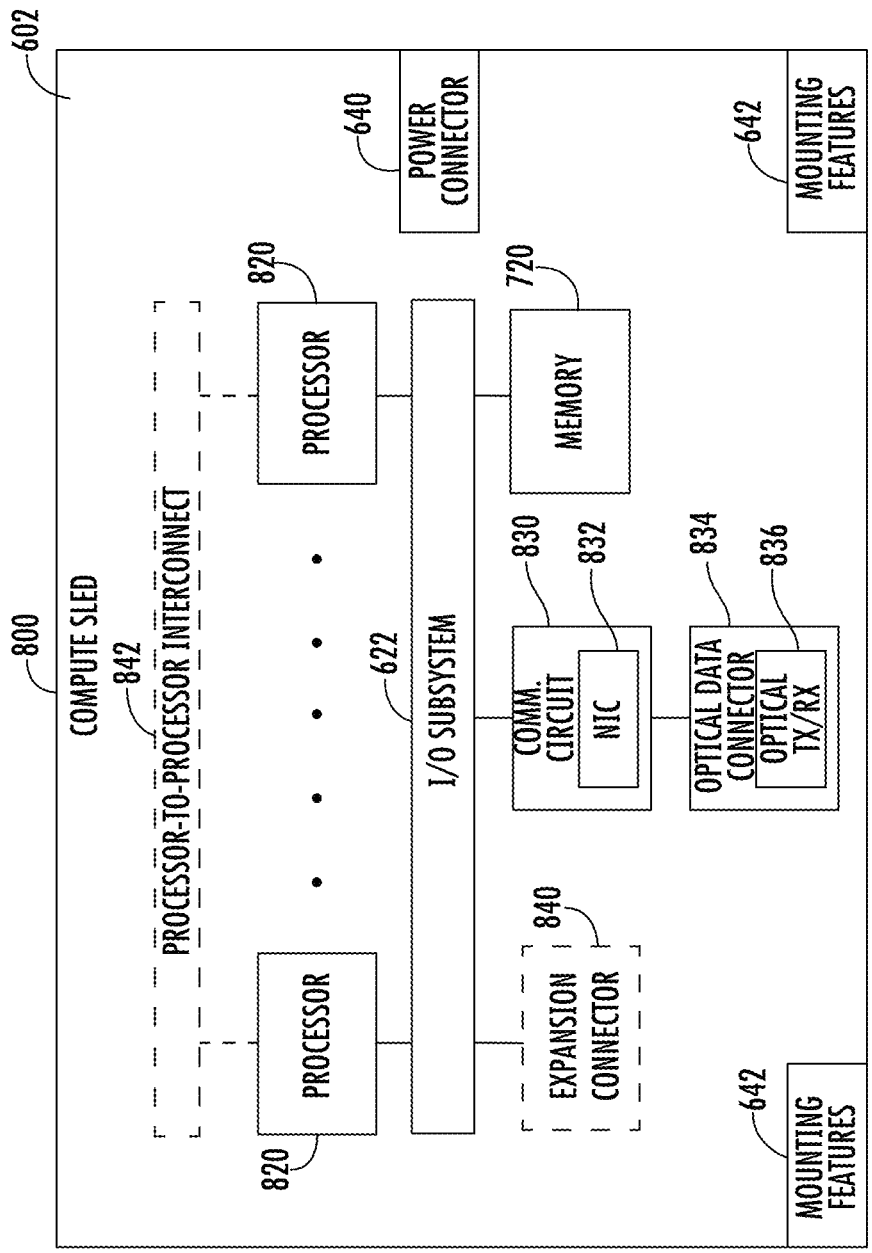
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
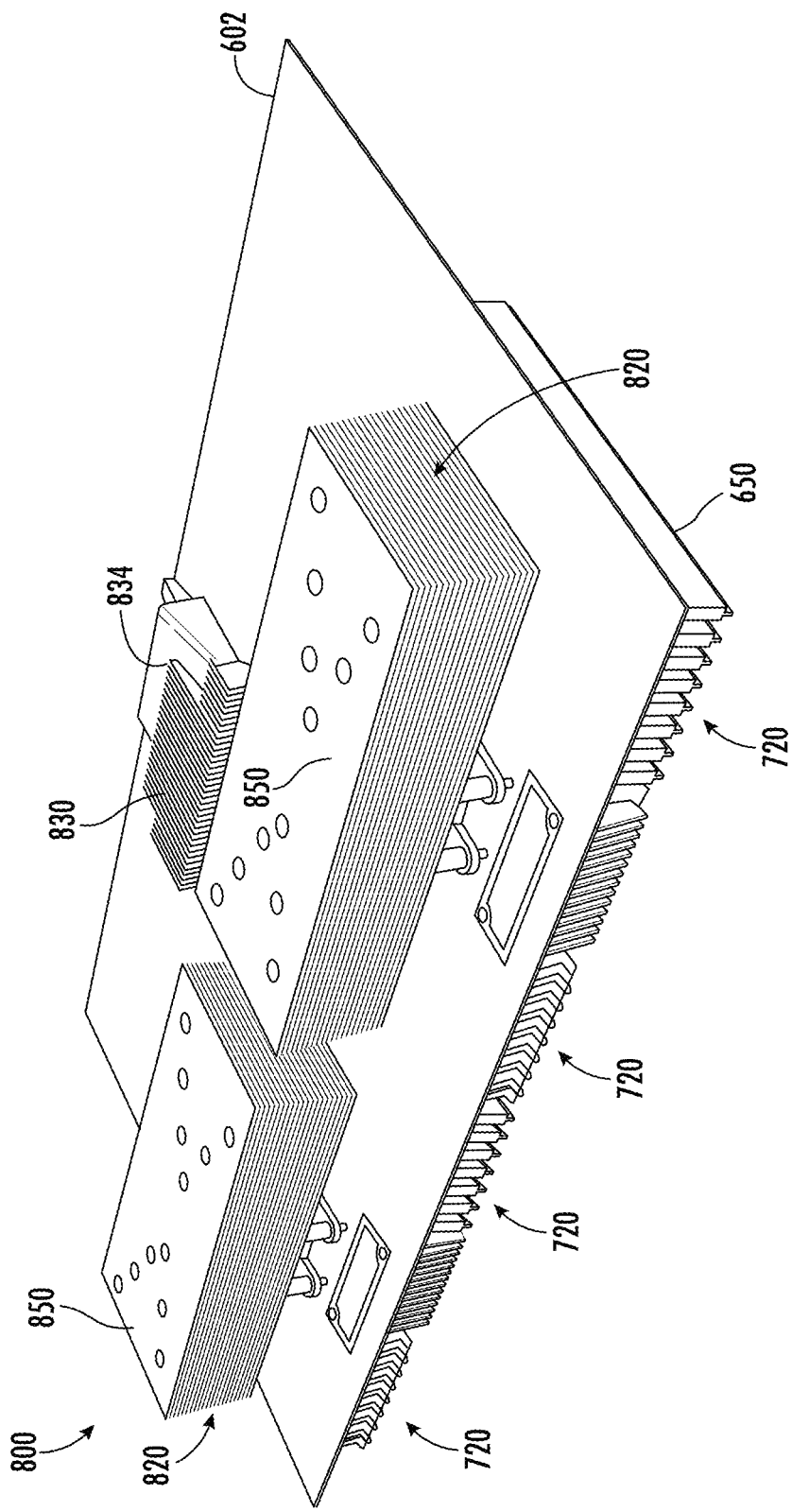
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
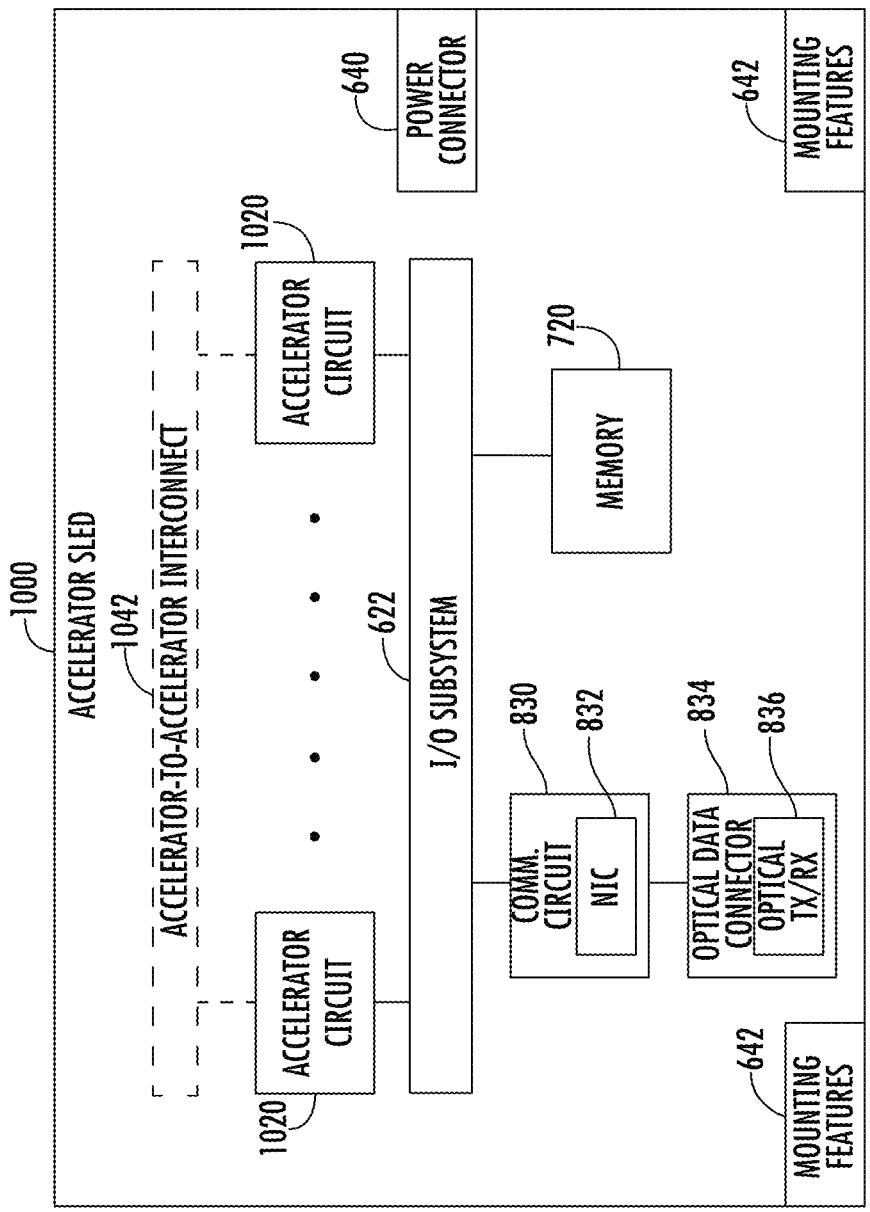
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
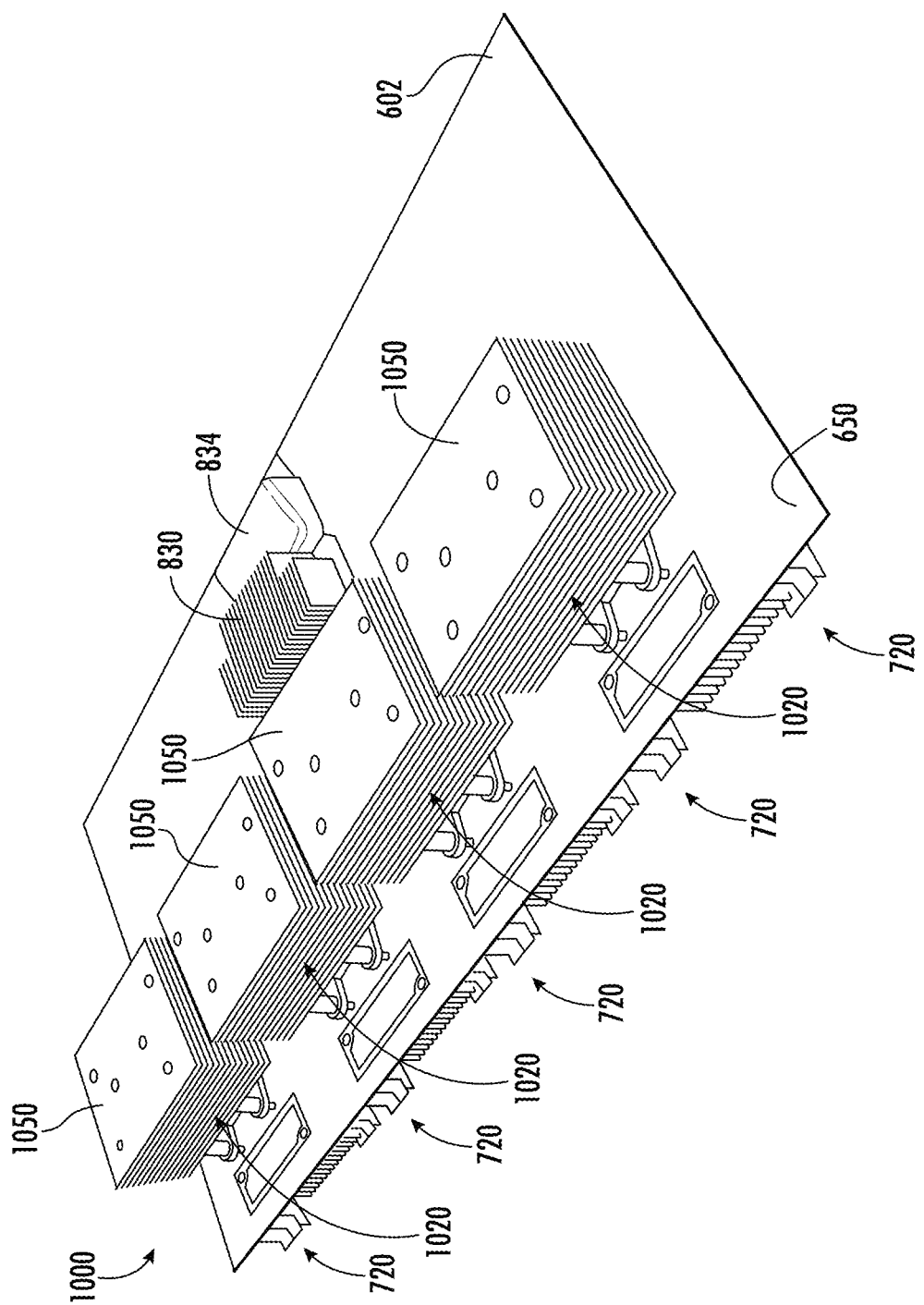
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
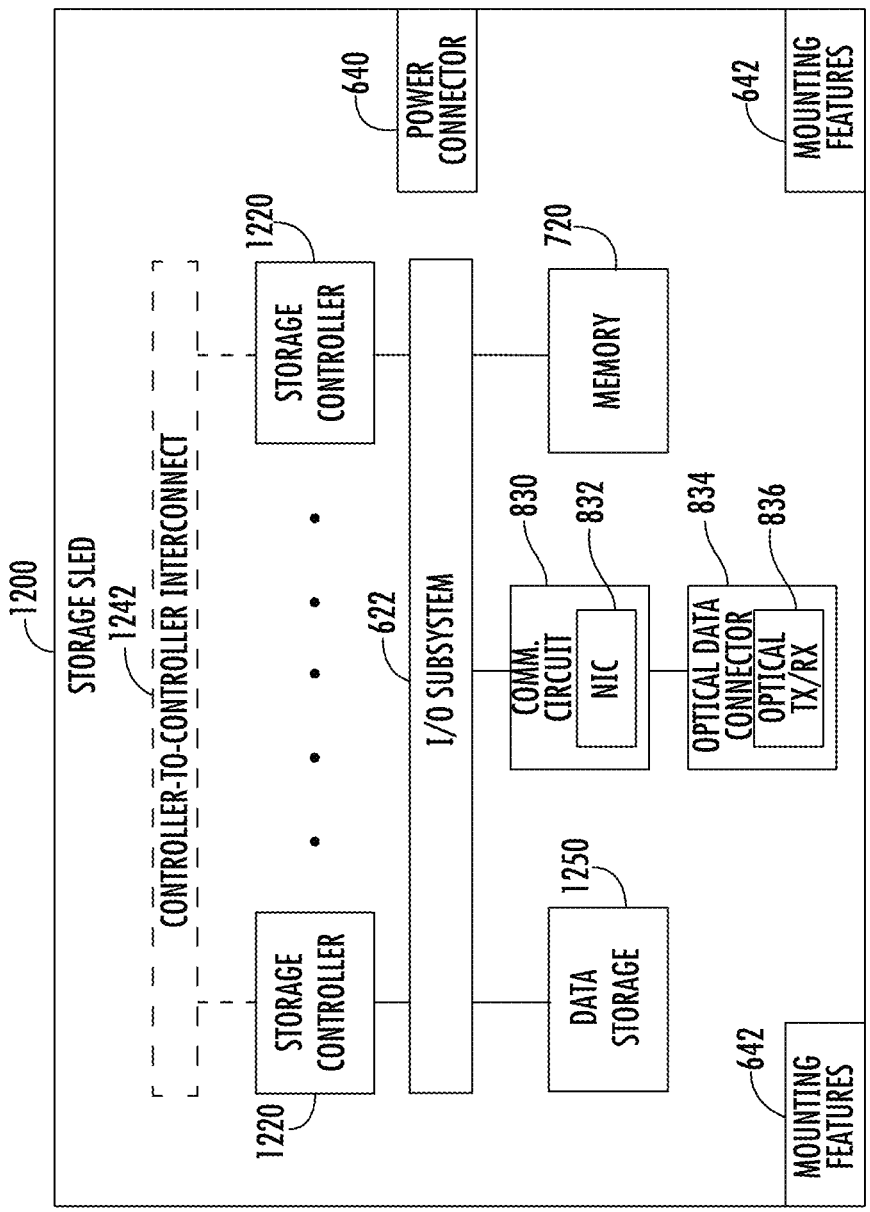
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
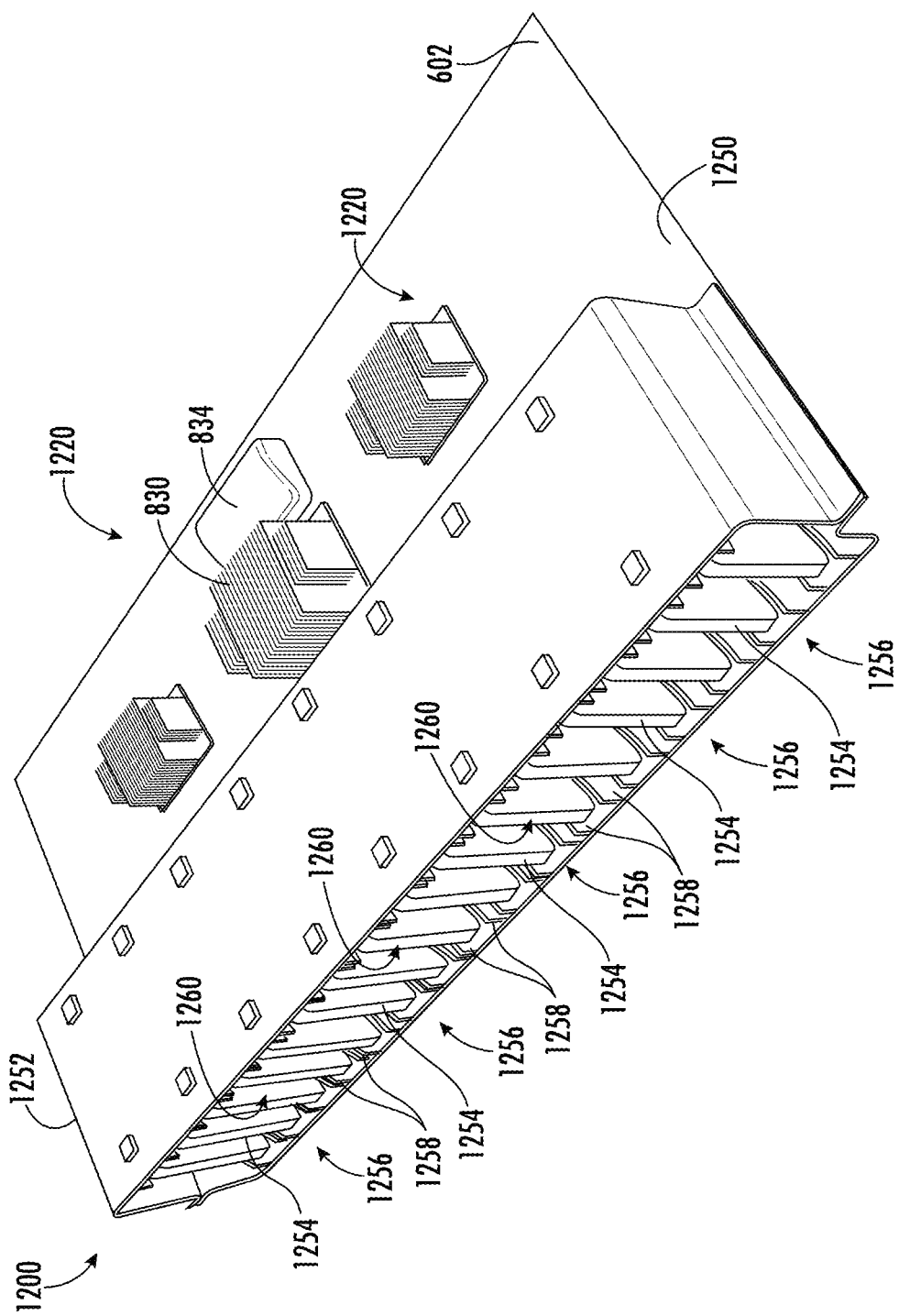
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
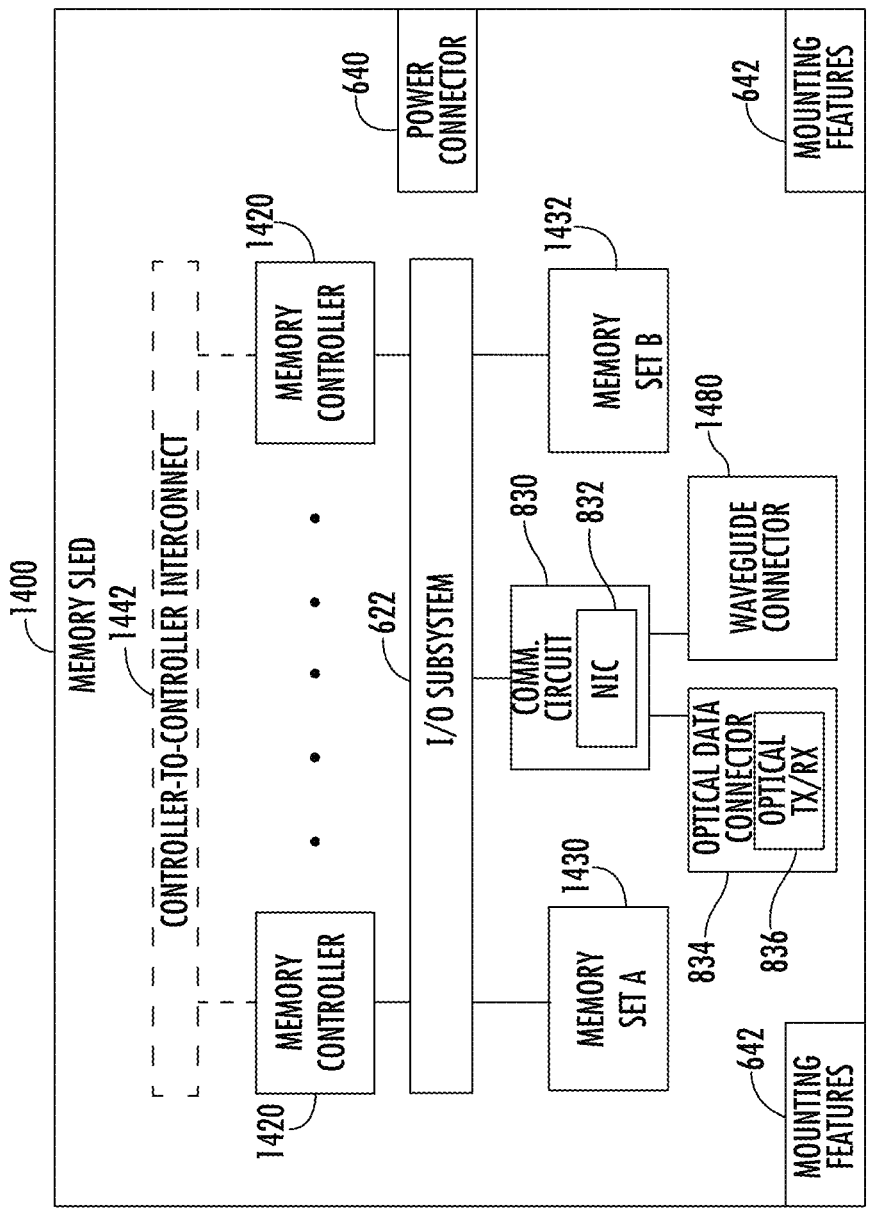
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
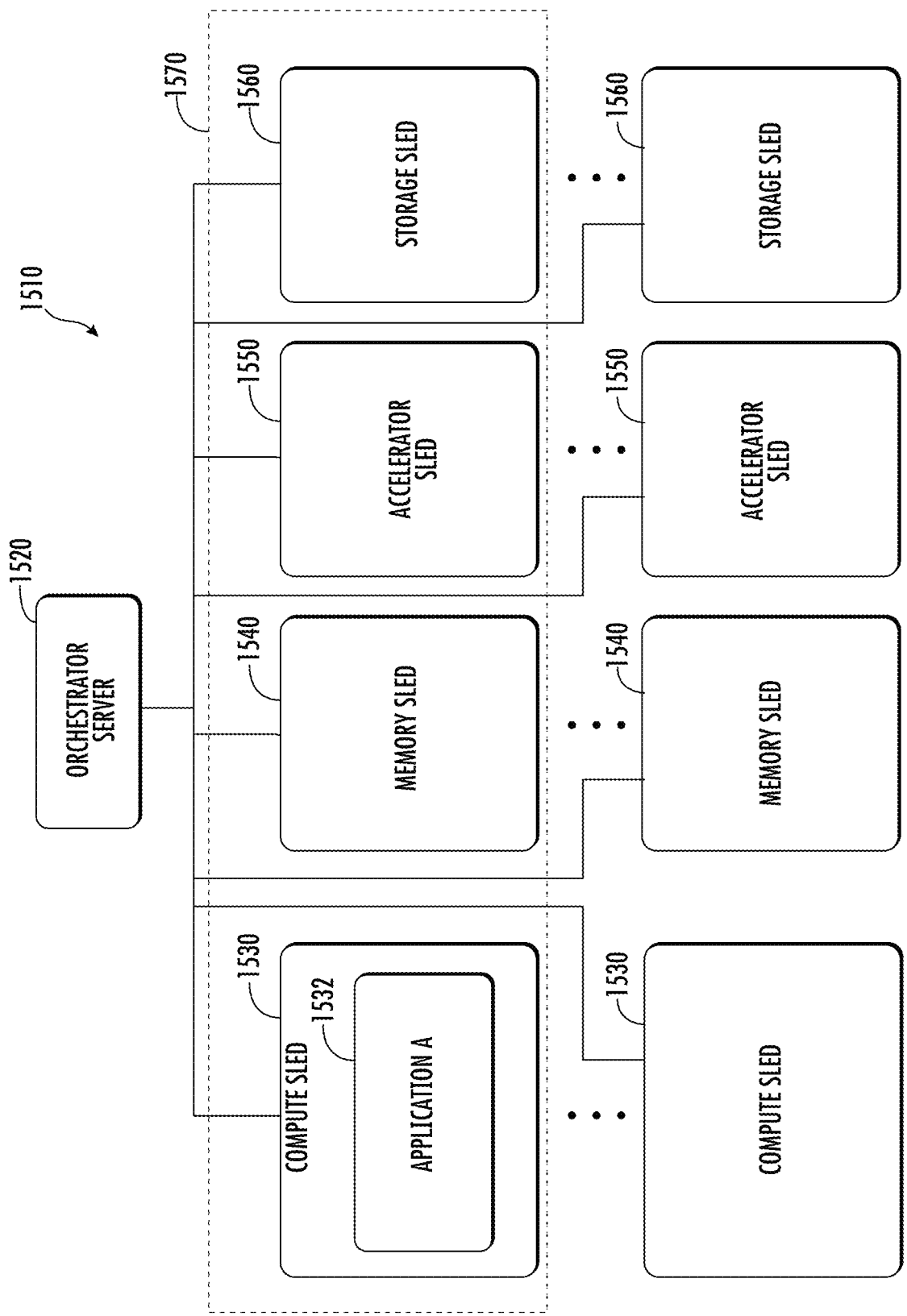
FIG. 15 is a simplified block diagram of a system that may be established within the data center.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
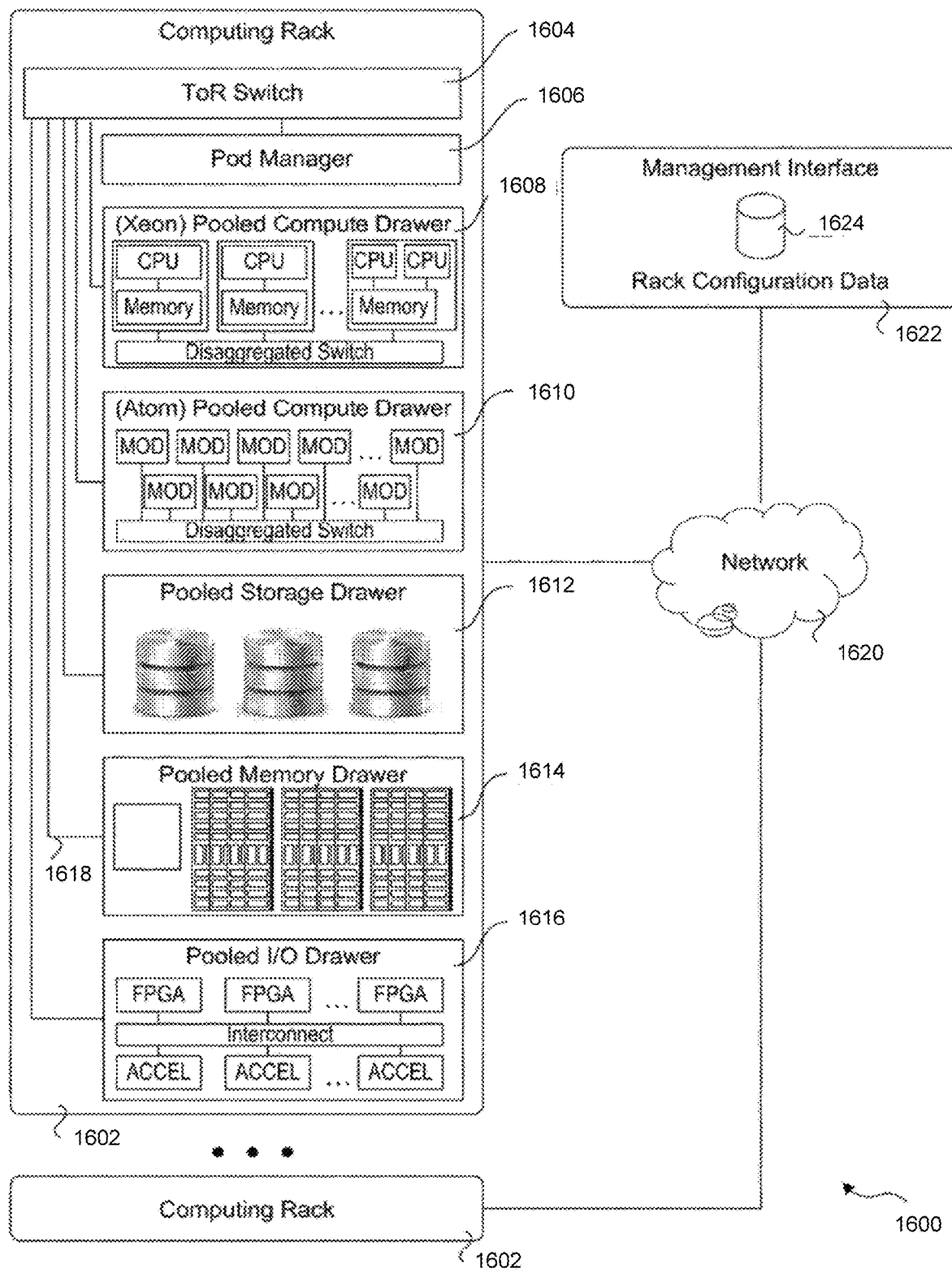
FIG. 16 depicts an environment with multiple computing racks.

FIG. 16 depicts an environment 1600 includes multiple computing racks 1602, each including a Top of Rack (ToR) switch 1604, a pod manager 1606, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1608, and Intel® ATOM™ pooled compute drawer 1610, a pooled storage drawer 1612, a pooled memory drawer 1614, and a pooled I/O drawer 1616. Each of the pooled system drawers is connected to ToR switch 1604 via a high-speed link 1618, such as a 40 Gigabit/second (Gb/s) or 100 Gb/s Ethernet link or a 100+ Gb/s Silicon Photonics (SiPh) optical link. In one embodiment high-speed link 1618 comprises an 800 Gb/s SiPh optical link.

Multiple of the computing racks 1600 may be interconnected via their ToR switches 1604 (e.g., to a pod-level switch or data center switch), as illustrated by connections to a network 1620. In some embodiments, groups of computing racks 1602 are managed as separate pods via pod manager(s) 1606. In one embodiment, a single pod manager is used to manage all of the racks in the pod. Alternatively, distributed pod managers may be used for pod management operations.

Environment 1600 further includes a management interface 1622 that is used to manage various aspects of the environment. This includes managing rack configuration, with corresponding parameters stored as rack configuration data 1624.

Figure 17:
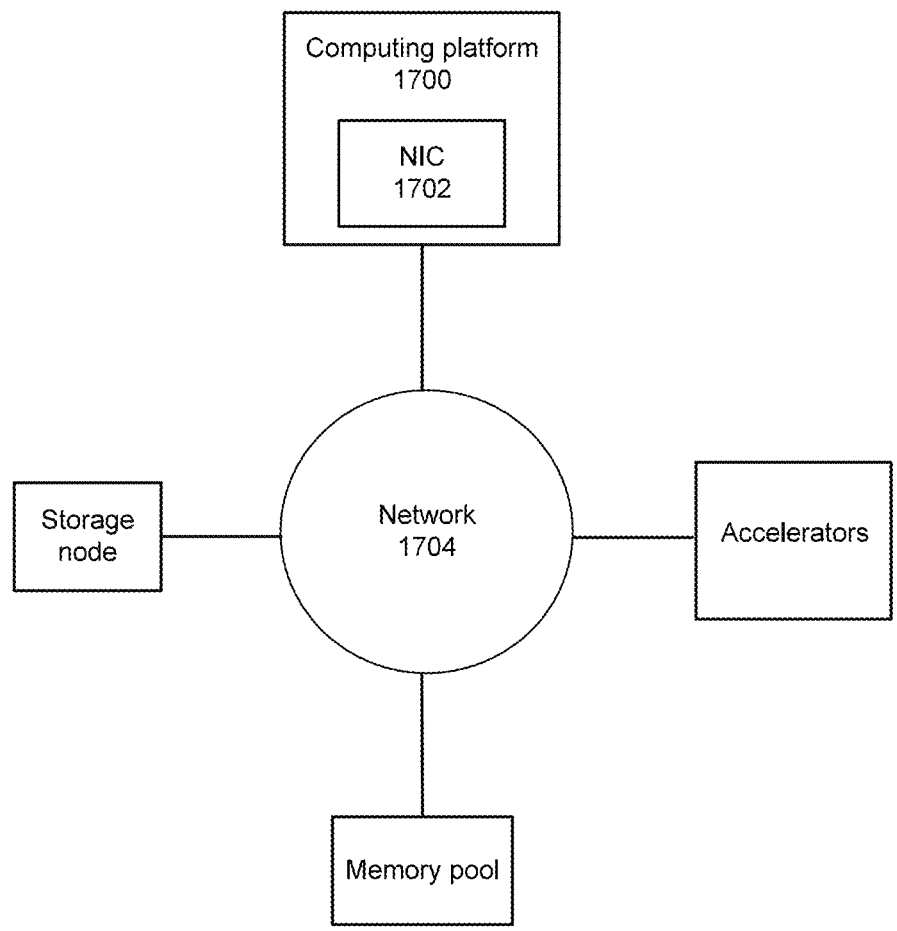
FIG. 17 depicts an example environment.

FIG. 17 depicts an example environment. For example, a computing platform 1700 can use a network interface (NIC) 1702 to communicate with at least one or more of a storage node, memory pool, accelerators, data centers (not shown), servers (not shown), client devices (not shown), or any device. NIC 1702 provides access to network 1704. Network 1704 can include any type of fabric, wired or wireless network, satellite network, bus, or interconnect. Network 1704 can be compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, and so forth. Content can be provided in an Ethernet frame, or communications compatible with InfiniBand, Internet Wide Area RDMA Protocol (iWARP), quick UDP Internet Connections (QUIC), RDMA over Converged Ethernet (RoCE), or others, and transmitted to a local or remote device using network 1704 for storage. Data and logs can be stored to virtualized storage nodes using a protocol such as NVMe over Fabrics (NVMe-oF).

Computing platform 1700 can include any type of computing device (e.g., CPU, FPGA, ASIC, GPU, and so forth) and can include multiple tiers of memory (e.g., L1, L2, LLC, DDR, HBM, persistent memory, 2-level memory (2LM), and so forth). Multiple tiers of memory can be coherent with data movements or copying between memories.

Figure 18A:
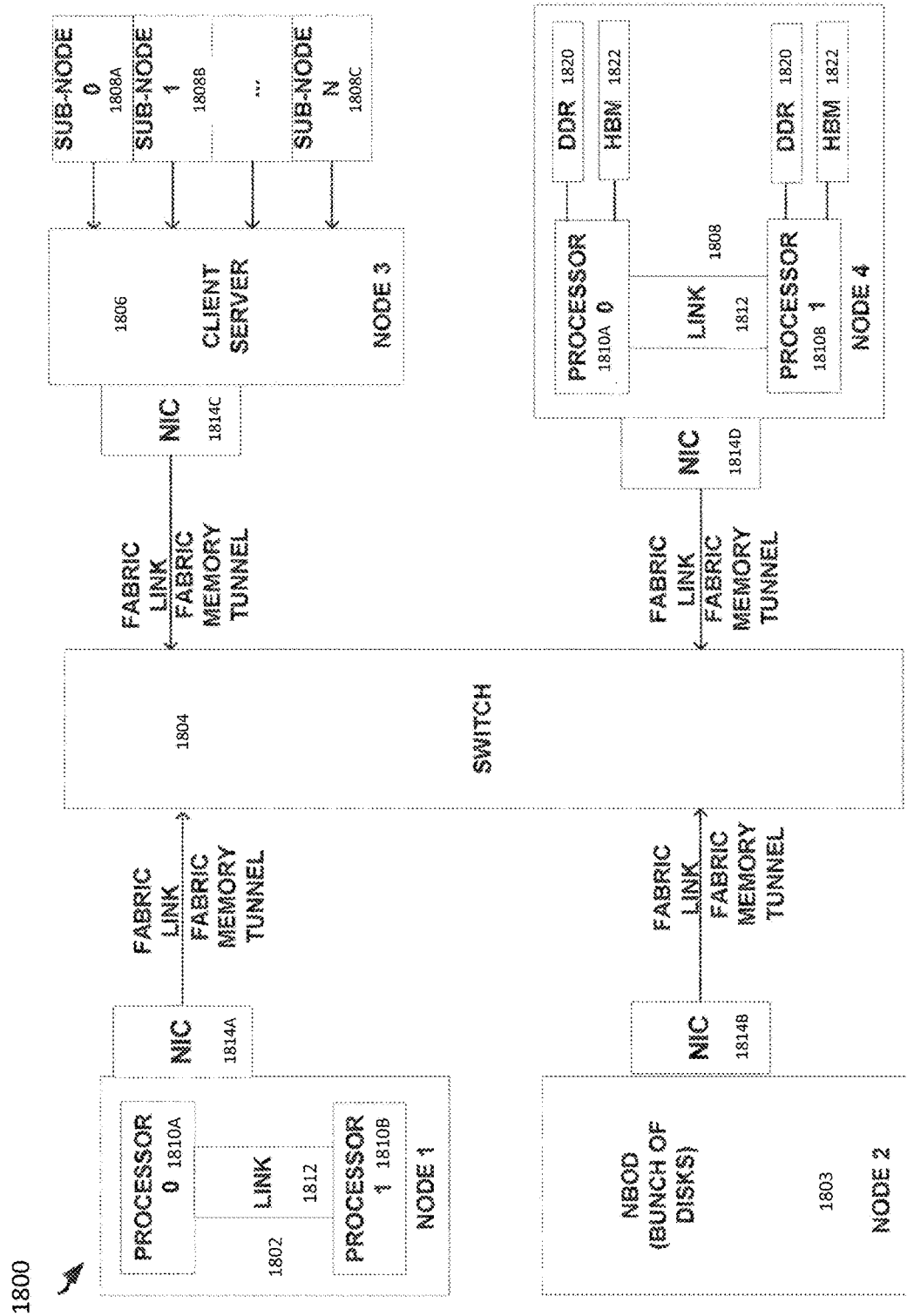
FIG. 18A illustrates, by way of example, a logical block diagram of an embodiment of a portion of a system.

FIG. 18A illustrates an example logical block diagram of an embodiment of a portion of a system. System 1800 includes a plurality of local nodes 1802 and 1803 and a plurality of remote nodes (e.g., 1806 and 1808) communicatively coupled through network interface controllers 1814A, 1814B, 1814C, and 1814D, and a switch 1804. One or more of the components of system 1800, in one or more embodiments, can be a part of or communicatively coupled to an enterprise data center. Switch 1804, in one or more embodiments, can include a NIC 1814 that can help in connecting the switch 1804 to a particular lane that connects to an end node. The switch 1804 can be one of a plurality of switches.

System 1800 includes compute nodes (e.g., the node 1802A) and pooled-resource nodes (e.g., the remote memory, such as can be part of sub-nodes 1808A, 1808B, and 1808C and or the node 1808). Remote memory 1820 and 1822 and/or the sub-nodes 1808A-C can provide the nodes 1802A-B with additional memory. Remote memory 1820 and 1822 and/or the sub-nodes can be exposed to the nodes 1802, 1803 locally, such as by a software protocol (e.g., a distributed file system, object map, or the like) or protocol such as NVMe or NVMe-oF.

Each of the nodes 1802, 1808 is illustrated as including a plurality of hardware processors 1810A and 1810B communicatively connected via a link 1812 and the NIC 1814A. Each of the NICs 1814A-D is communicatively coupled through the switch 1804.

A caching agent can be a coherency agent in a node that processes memory requests from the cores within the same node. A Home Agent (HA) can be a node (e.g., node cluster) that is responsible for processing a memory request from a caching agent and acting as a home for part of the memory address space (note that one die (e.g., processor) can have multiple homes in a distributed address space mapping). Depending on the address space that a request is targeting, a request can go to the same node's local memory. Additionally, or alternatively, a memory request can go to an interface (e.g., a quick path interconnect (QPI), PCIe, or other) to route the request to the other processors within the same coherent domain, or to processors outside the coherent domain, through the NIC. A NIC can operate as a host-fabric interface or fabric interface. Processors connected on one side of the interface can belong to the same coherent domain. Thus, the nodes 1802 and 1803 can be part of the same coherent domain and node 1803 can provide local memory for the node 1802.

A system can include one or more coherent domains connected through a fabric interconnect (e.g., one or more of a fabric link, a fabric memory tunnel, and a switch). For example, high performance computing (HPC) or data centers can include N clusters or servers that can communicate with each other using the fabric interconnect. Using the fabric interconnect, each coherent domain can expose at least some address regions to other coherent domains. However, accesses between different coherent domains are not coherent, such as can include heterogeneous access latency times. Embodiments herein allow for reduction of the access latency times, such as by prefetcher at the NIC 1814A-D.

A memory request can proceed as follows: (1) a node generates a memory request (e.g., a memory read or a memory write request); (2) the memory request is provided to a caching agent (CA), such as a processor or node-level CA; (3) the CA uses a system address decoder (SAD) to decode that the memory request is targeted or homed to a memory location in a specific memory; (4) the SAD can return the address of the memory to which the request is homed; and (5) the memory request is forwarded to a memory controller of the memory to which the request is homed so that the memory request can be fulfilled. The fulfillment of the request can take more or less time depending on the type of memory being accessed, whether the memory is remote or local, and/or a bandwidth of a device between the requesting node and the node to which the request is homed.

Nodes 1802 and 1803 route each of its remote memory requests through respective NICs 1814A and 1814B. According to some embodiments, NIC 1814A or 1814B can implement a prefetching scheme, such as can be implemented by prefetcher of the NIC 1814A.

Switch 1804 determines a node identification corresponding to the memory address that is the subject of the request (e.g., in response to detecting that no target identification or a specific target identification is specified). Switch 1804 then generates another request (with the proper node identification) and forwards the request to the node that includes the corresponding address. The requested data (if a get request) or an acknowledgement (ACK) (if a put request) can then be routed back to the node that initiated the request, such as through one or more network interface controllers and/or switch(es). A not or negative acknowledge (NACK) or error packet can be generated in the case of a failed get or put request.

A memory controller can be a hardware, software, and/or firmware component that can initiate transactions with memory. A CA can retain one or more copies in a CA own cache structure. A caching agent can provide one or more copies of the coherent memory contents to other caching agents or other components, such as NICs, switches, routers, or the like. To perform a memory request, a core (e.g., a processor) sends a request to a caching agent. The caching agent determines if content associated with the address requested is stored in its LLC. If the address requested is not cached in the LLC, then the caching agent sends the request to: (1) the local memory controller if the line is home (stored) in the memory of the local socket (the node of which the processor is a part) and/or (2) the NIC if the request is homed (stored) in the memory of a remote node. The remote node receiving the memory request will forward the request to the memory controller in the node.

NIC 1814A-D is a hardware component that connects a node to a network (e.g., the node 1802 and 1803 to the network(s) connected to the switch 1804). NIC 1814A-D hosts circuitry to communicate using a specific standard (e.g., Ethernet, Wi-Fi, Internet Protocol (IP), cellular (e.g., Long Term Evolution (LTE), or the like). NIC 1814A-D allows nodes to communicate over wired or wireless connections therebetween. NIC 1814A-D can provide access to a physical layer and/or a data link layer, such as by providing physical access to a network medium and for addressing, such through media access control (MAC) addresses in the case of an Institute for Electrical and Electronics Engineers (IEEE) 802.11 network. NIC 1814A-D receives memory requests that are determined, by the system address decoders, to be homed remotely. NIC 1814A-D provides such memory to the switch 1804, such as with or without modification.

Switch 1804 filters and forwards packets between networks (e.g., local area network (LAN) segments, LANs, and/or WANs). Switch 1804 can operate at the data layer and/or the network layer. Switch 1804 keeps a record of the addresses of devices connected to it. With this information, the switch 1804 can identify which system is connected to which port. Therefore, when a memory request is received, the switch 1804 can determine which port thereof to forward the request.

NIC 1814C provides a request to the client server 1806, which serves the request to the proper sub-node 1808A-C, for example. Server 1806 provides resources to the sub-nodes 1808A-C, which request services of the server 1806. A response to the request from the sub-node 1808A-C is provided back to NIC 1814C. NIC 1814C provides the response to the switch 1804, which decodes the address to which the response is homed. Switch 1804 then provides the response to the NIC 1814A, which provides the response to the corresponding processor 1810A-B.

Figure 18B:
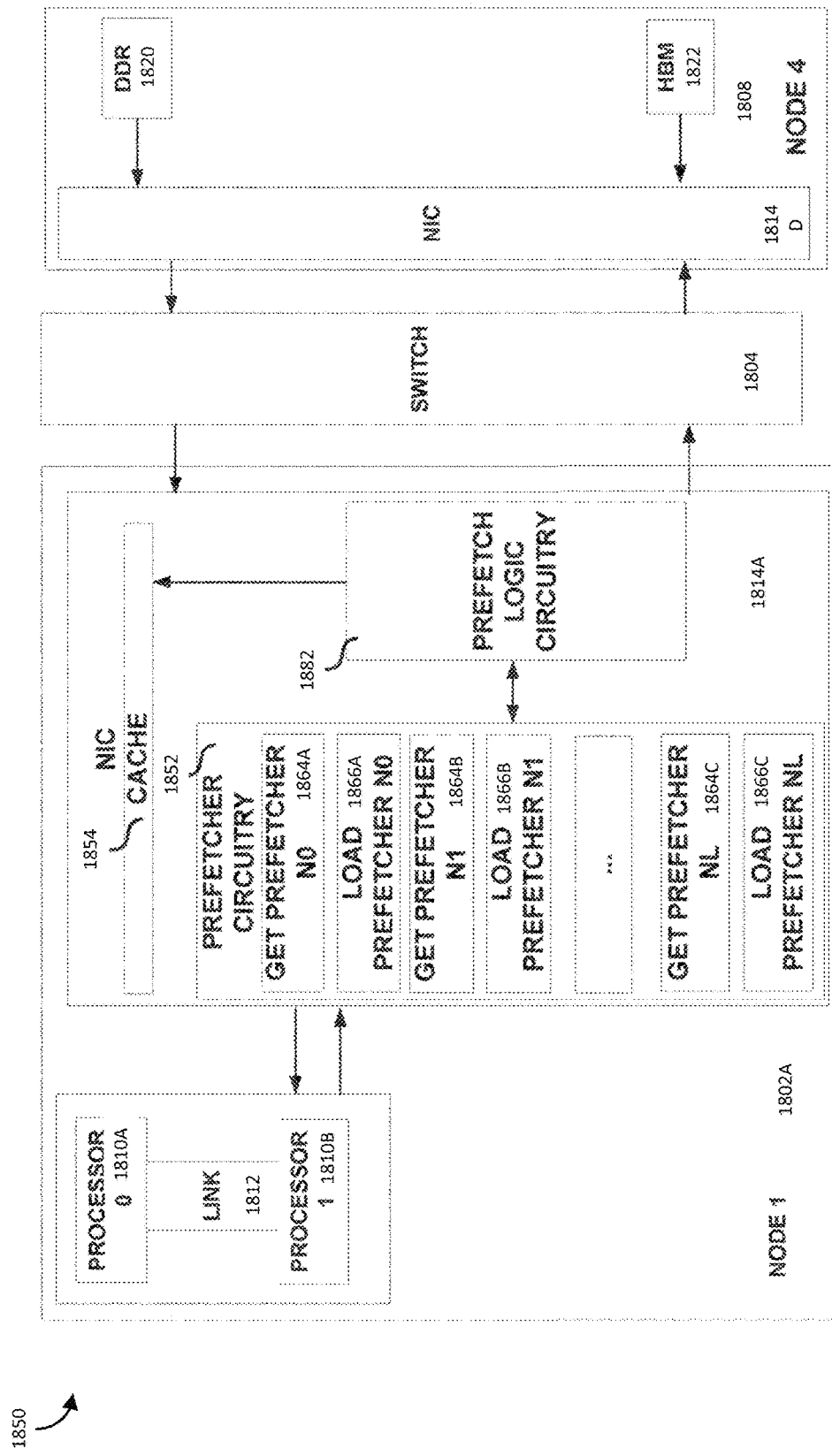
FIG. 18B illustrates an example system.

FIG. 18B illustrates an example system. NIC 1814A uses a cache 1854 (e.g., a level one (L1) cache or level two (L2) cache), and prefetcher 1852. Prefetcher 1852, in one or more embodiments, can include get prefetchers 1864A, 1864B, 1864C and load prefetchers 1866A, 1866B, and 1866C, and/or prefetch logic 1882. In one or more embodiments, a prefetcher can be implemented for each remote memory that can be accessed by local node 1802A. In one or more other embodiments, NIC 1814A can include fewer or more prefetchers than the number of remote memories which the local node 1852A can access, such as can include a single shared prefetcher dedicated to two or more remote memories, or another configuration.

Prefetcher 1852 can monitor requests issued by the node 1802A. Prefetcher 1852 can determine whether there are any patterns (e.g., repeated sequences of address requests) in the requests issued. Based on the determined patterns, prefetcher 1852 can issue one or more requests that preemptively or proactively retrieve content (e.g., before the node 1802A produces a request for the content). The preemptively retrieved content can be stored in cache 1854, such as to reduce a latency realized in node 1802A accessing the content from remote memory 1870 and/or 1872.

Prefetcher 1852 can use a system address decoder (SAD) (not depicted). SAD can include remote memory configuration data, such as stored on a memory of the SAD, and quality of service (QoS) monitoring circuitry. SAD can receive a request (e.g., a load, store, get, put, or other request) and determine a node address to which the request is homed. SAD can populate cache 1854 with at least some of the results returned from requests.

SAD can determine whether a request is homed to an address that is not local (the request is associated with memory in a remote node). This can be by determining that the address is not local (is not present in local memory and therefore is homed to a remote address) or determining that a characteristic of the request indicates that the memory request is a memory request for a remote address, such as a target identification in the request being blank or a specified value (of a specified range of values) (e.g., a maximum, minimum, or other value). In response to determining the request is homed to an address that is not local, SAD can forward the memory request to NIC 1814 that forwards the request to a switch 1804 using a switch decode request. In one or more embodiments, NIC 1814 can modify the request before forwarding the request to switch 1804.

Some prefetchers (e.g., 1864A-C and/or 1866A-C) can predict and prefetch next data that a thread (e.g., a processor) will access (e.g., by a get or load request) in the remote memories which the corresponding prefetcher is dedicated to accessing. Some prefetchers, in one or more embodiments, can implement one or two different types of memory address prefetches: (1) prefetcher memory lines from remote memories based on memory references that an application running in the local node 1804A has generated (e.g., load/store instructions), such as in embodiments in which the remote memory is tunneled over the fabric (e.g., the NIC and/or the switch) can be accessed by load and/or store instructions; (2) prefetch memory lines from remote memories based on memory references that an application running on the local node has generated using put/get instructions. In one or more embodiments, both load/store instructions and get/put instructions can be handled by a same prefetcher.

System 1850 (and other embodiments discussed herein) are compatible with existing SADs, such as can include existing SADs modified to include or be communicatively coupled to prefetcher circuitry, such as the Get prefetchers 1864A-C, load prefetchers 1866A-C, and/or prefetcher predictor. The SAD can return a memory type of the target node (e.g., the node to which a request is homed). The SAD can return a granularity with which data is to be prefetched (e.g., 32 bytes, 64 bytes, 128 bytes, 256 bytes, etc.). The SAD can control an injection rate (how aggressively the prefetcher retrieves data from the remote memory).

Parameters (e.g., the injection rate and the granularity, among others) can be configured at boot time in each of the NICs 1814. The granularity and/or the injection rate can help maintain a quality of service (QoS). In one or more embodiments, a higher injection rate can be used for a high bandwidth memory (HBM), and a lower injection rate can be used for a lower bandwidth memory (as compared to the HBM) or a memory that is more critical to the system. The injection rate can be based on a prefetch distance (e.g., how far ahead of the current request will the prefetcher act) and prefetch degree (e.g., how many prefetches will be executed per request). Note that a request is a load, store, put, get, or other like operation. Prefetcher can tie up a memory by performing too many accesses, not leaving the memory available for access by other resources of the system.

In one or more embodiments, a remote node (e.g., a remote memory controller or a server) can provide an indication to prefetchers that causes the prefetchers to adjust their injection rate. The remote node can detect that the remote memory is not able to keep up with the current demand, and in response, can provide the indication to one or more of the prefetchers that is accessing the remote memory. The prefetcher can then reduce the injection rate (or stop prefetcher), such as to help reduce the demand on the remote memory. The injection rate can also be set based on historical usage of a remote memory.

The prefetcher can implement a prefetching scheme, such as can include a cache block, a nonblocking load, hardware-controlled prefetcher, and/or software-controlled prefetcher. In one or more embodiments, each of the prefetchers can implement a same prefetching scheme or one or more prefetchers can implement a different prefetching scheme than another prefetcher. Prefetching is useful if an address that an application will access can be determined ahead of time. Some applications may include an access that is non-deterministic (e.g., unpredictable). Prefetcher can be implemented using hardware, a compiler, and/or a programmer. In one or more embodiments, the prefetched data can be stored in a cache used by the application (e.g., the L1 or L2 cache), a prefetcher cache, or cache or memory in the NIC.

Prefetch logic 1882 monitors processor accesses, determines patterns/strides, and generates (e.g., automatically) prefetch addresses. In execution-based prefetcher (e.g., software pre-fetching), a thread is executed to prefetch data for an application. The thread, or prefetch access order or predictor, can be generated by a programmer or by the hardware.

Some hardware prefetching schemes always prefetch N addresses after an access operation. This scheme is simple and works well with sequential access patterns, but does not work well with non-sequential access patterns. Another hardware prefetching scheme includes a stride prefetcher (e.g., an instruction program counter or cache block address based prefetcher). In a stride prefetcher, a distance between memory addresses referenced by a load or get instruction (e.g., a stride of the instruction) as well as the last address referenced by the load or get. The next time the same address is fetched, the last address plus the stride, plus other addresses, can be prefetched.

Another hardware prefetching scheme includes a stream buffer prefetcher. In a stream buffer prefetcher, each stream buffer holds a stream of prefetched cache lines. On a load, an entry of all stream buffers can be checked for an address match. If there is a match, the cache can be updated. If there is no match, the stream buffer(s) can be updated to include new data, such as based on stride prediction.

In scale out architectures (e.g., Ethernet compatible fabric or network), nodes that act as compute sleds provide access to different compute resources. For example, a compute sled can offer accelerated processing, storage, memory pools, or artificial intelligence (AI) inference capability. A challenge with scale out architectures is data availability when processing is to commence.

Various embodiments provide for proactive or speculative prefetches of data or other content (e.g., instructions, parameters (e.g., neural network weights), or messages) from a remote device memory or storage based on fabric or network bandwidth availability and capacity to store data. Proactively or speculative writing of data (or other content) to a remote target memory or storage is also provided. While embodiments are described with respect to a host that issues pre-fetch requests and proactive prefetch requests, embodiments can be used for accelerator or remote processor devices to also prefetch or proactively prefetch data from an application's memory space or device's memory space.

Various embodiments expose an interface to a software stack to provide a capability to prefetch content from a remote resource. A network interface can include a memory device (e.g., cache or volatile memory). A network interface can include or use a host fabric interface and vice versa. An application or device can request prefetching of data (or other content) and the network interface will copy the data (or other content) to its memory device before it is to be processed or accessed using level 1 (L1) cache or level 2 (L2) cache. Multiple tiers of memory or storage can be available to store data or content for use by a computing platform via a local connection. A local connection can include access to a memory or storage via a bus, interconnect, socket. A local connected memory can use a memory bus, interconnect, or interface to connect with a CPU or cores instead of through a fabric or network For example, multiple tiers of memory or storage can include one or more of: a cache (e.g., L1, L2, L3, LLC), memory (e.g., DDR compatible memory or HBM compatible memory), persistent memory (e.g., Intel Optane® or Samsung Z-NAND), storage (e.g., NAND or 3D NAND), or 2-level memory (2LM). Various embodiments can copy data from a tier of memory or storage to a cache (e.g., L1 or L2 cache) before a time limit specified by an application or device for processing or access by the application or device.

Figure 19A:
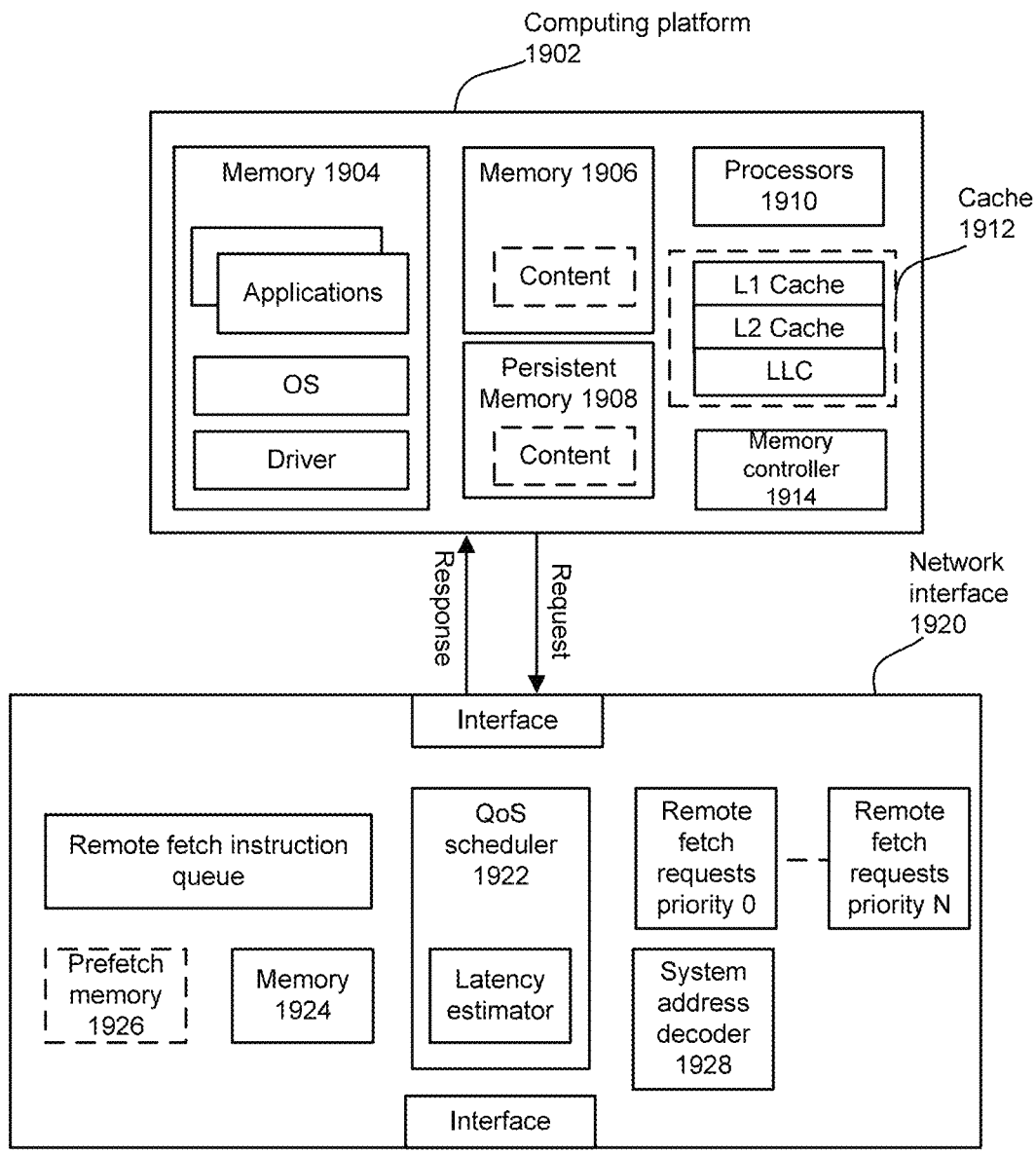
FIG. 19A depicts an example system.

FIG. 19A depicts an example system. Computing platform 1902 can provide processors, cache and memory for use by applications to process data. Computing platform 1902 can provide software with computation capability using one or more processors and/or accelerator devices. For example, an operating system (OS) and driver executed by processors on computing platform 1902 can provide an application with access to network interface 1920. Network interface 1920 can provide computing platform 1902 with communications with another network device or computing platforms. A network device can be an interface to any type of network (wired or wireless), interconnect, fabric, bus, and so forth. A network device can be an intermediary that is to receive and transfer content from a remote memory to a memory in network interface 1920 and/or computing platform 1902 in connection with content prefetch. Network interface 1920 can allocate memory bandwidth, network device egress bandwidth, and memory space for any network device for use with a prefetch.

Network interface 1920 can expose an interface to the software stack of computing platform 1902 that can be used to copy contents of a memory region mapped in a remote node to the local memory cache of network interface 1920 (e.g., memory 1924 or 1926) or a memory tier (e.g., memory 1904, 1906, 1908 or cache 1912) of computing platform 1902 prior to use by an application via a cache used by a processor of computing platform 1902. A command can be exposed to a core or processor 1910 for use to program a prefetching of content from a remote memory or storage device prior to access from a cache in computing platform 1902. An application or software can issue to network interface 1920 a command with a pointer to prefetch information from a remote or far memory or storage device. The far prefetch information can include one or more of: (1) base virtual address to be fetched from remote memory, (2) an integer indicating the amount of lines need to be fetched from remote memory, (3) the remote node storing the region to be fetched, (4) priority of the given prefetch associated with an application (PASID), (5) flag (e.g., one or more bits) to indicate if resources (e.g., buffers in network interface, any network device, remote memory, remote storage) in the end-to-end path (from remote memory or storage to computing platform 1902) are to be reserved for the transfer of content to network interface 1920 or memory tier(s) of computing platform 1902, (6) a length of time of validity of the request and the length can be specified with an integer value that specifies the amount of time and an integer that specifies the units of the amount of time (e.g., 1=ns, 2=ms, etc.). The time of validity can be a time or timer at which data is needed in an L1 or L2 cache (or other tier of memory (e.g., LLC, DRAM, or HBM) of computing platform 1902 or in a cache or memory of network interface 1920 for processing or access (using units specified for the amount of time). After the time or timer completes, reservation of resources can be released. An application or device can send the command using any standard or proprietary interface between computing platform 1902 and network interface 1920.

Applications or devices running in computing platform 1902 can be programmed to identify what data is needed from a remote node in advance of when the data is to be processed or accessed, can cause a pre-fetch of this data to a cache or memory of network interface 1920 or a memory tier of computing platform 1902. In some cases, a pre-fetch does not pollute a L1 or L2 cache of the local cores of the computing platform or L1 or L2 of network interface.

In some embodiments, when an application is available for execution using a processor (e.g., application is instantiated), a region of memory is determined and known in which target data will reside in a remote or local device. Network interface 1920 includes system address decoder (SAD) 1928 for translating request from software stack (TLB) from virtual to physical address and network interface can determine a physical address in a remote memory. Virtual-to-physical translation and vice-versa in local and remote nodes can be handled using hardware resources such as input-output memory management unit (IOMMU) or other address translation device or service. In some cases, an application or accelerator can request prefetch of data without knowledge of whether the data is locally stored or stored remotely.

For a path of different network devices that pre-fetched content traverses (e.g., network interface, switch, buffers) from the remote memory to memory of network interface 1920 or any of memory tiers of computing platform 1902, Quality of service (QoS) scheduler 1922 can reserve network bandwidth resources (e.g., egress bandwidth and queues) to make sure data is received fast enough to comply with specific time requirements specified by an application. QoS scheduler 1922 can also allocate space in cache or memory buffers in devices along the path, including network interface 1920 and computing platform 1902. In some examples, QoS scheduler 1922 can coordinate with a POD manager to discover resources (e.g., bandwidth or memory space) to be reserved and reserve a flow that carries content from a remote memory for a content pre-fetch. In some examples, QoS scheduler 1922 can communicate with a pod manager, orchestrator, hypervisor, virtual machine manager (VMM), or other device manager that manages bandwidth and memory space for a content pre-fetch.

QoS scheduler 1922 can determine if sufficient bandwidth or buffer resources are available to complete a pre-fetch request in a specified time. When a prefetch does not have sufficient associated resources or the time for how long that prefetch has a particular resource in the end-to-end path has expired, QoS scheduler 1922 can terminate or decline the prefetch. For example, QoS scheduler 1922 can determine bandwidth and memory resources to use for a prefetch of content to memory 1924 or 1926 of network interface 1920, a local memory tier (e.g., memory 1906) of computing platform 1902 to the cache (e.g., L1 or L2) used by an application or accelerator. If insufficient resources are available such that the prefetch cannot be completed within a prescribe time limit, QoS scheduler 1922 can inform the requesting application or device that the prefetch request is declined. QoS scheduler 1922 can drop or decline a prefetch requests if any of the intermediate resources do not have resources to allow a prefetch complete in a required time. If a response to a prefetch is not received in the required time, the response can be dropped and not be stored in allocated memory.

QoS scheduler 1922 can prioritize bandwidth and memory buffer space allocated for prefetch requests of higher priority. In a case where multiple prefetch requests are received, QoS scheduler 1922 can allocate bandwidth and memory buffer space for a request of higher priority. In a case when prefetch requests have the same priority level, QoS scheduler 1922 can select a prefetch request with a lower required time to completion.

Various embodiments can use system main memory (e.g., 1904, 1906, and/or 1908) with at least two levels of memory (alternatively referred to herein as "2LM") that includes cached subsets of system disk level storage (in addition to, for example, run-time data). This main memory includes a first level (alternatively referred to herein as "near memory") including smaller faster memory made of, for example, DRAM or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

Various embodiments can provide temporal hints on when the prefetching schemes are valid, what is the associated priority and when they are droppable or not. For instance, droppable means that if a given tier cannot process a given prefetch, the tier may decide to drop it without providing any reason to the whomever is generating the prefetch. Different levels of pre-fetch priorities can be supported and discovered by other devices.

Figure 19B:
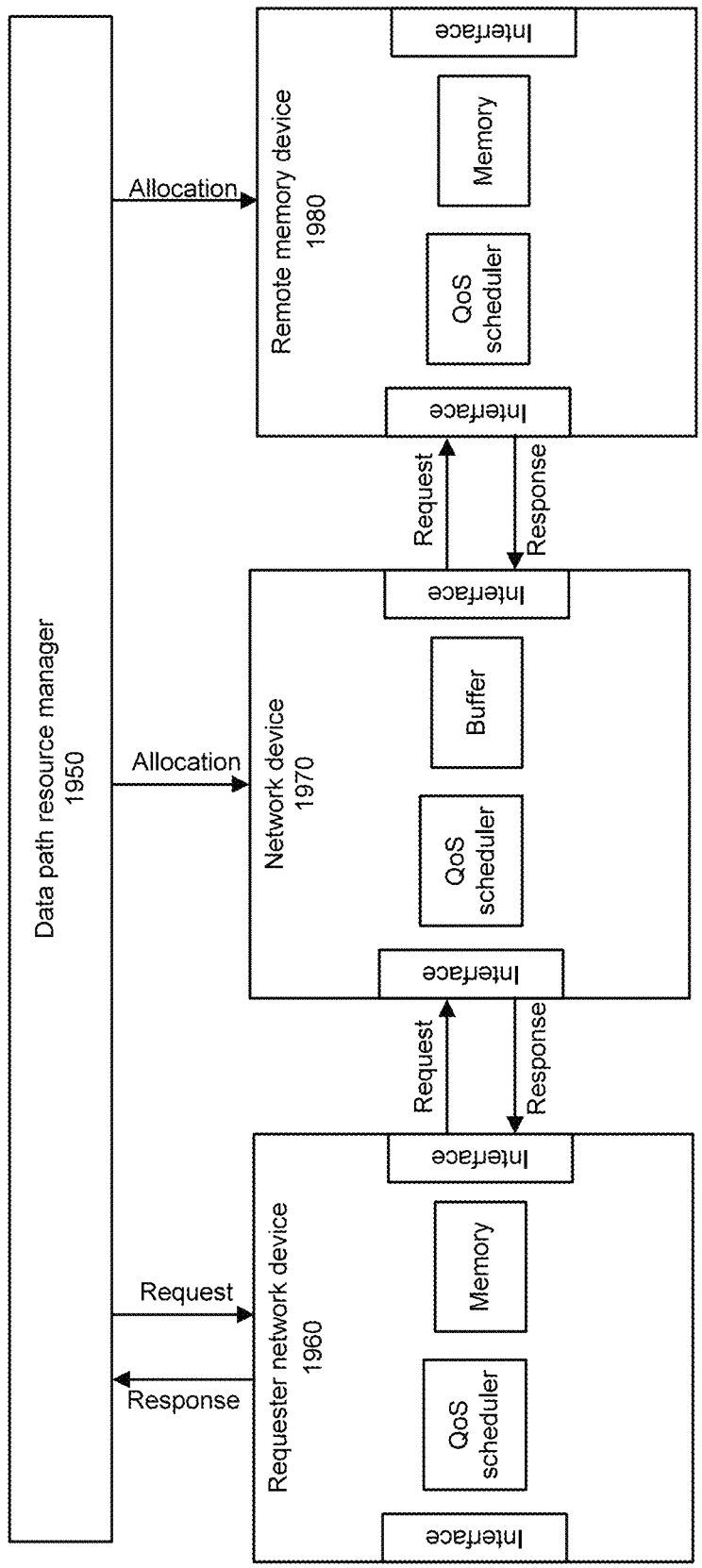
FIG. 19B depicts an example of device interaction.

FIG. 19B depicts an example of device interaction for a prefetch. Data path resource manager 1950 can provide for coordination of bandwidth and memory buffer space allocation in any network device along a path from a remote memory to one or more memory tiers through zero or more network devices. For example, data path resource manager 1950 can be a pod manager, orchestrator, hypervisor, virtual machine manager (VMM), or other device or software. In this example, a single network device 1970 is an intermediary between a remote memory device 1980 and the computing node's network interface 1960. In other examples, there is no intermediary network device between the remote memory and the computing node's network interface. In some examples, there are multiple intermediary network devices. Content can be retrieved from remote memory device 1980 and copied to requester network device 1960. In some cases, content can be copied (pre-pushed) from a memory of a requester network device 1960 or computing platform that uses requester network device 1960 to a memory of remote memory device 1980. Network interface and devices 1960, 1970, and 1980 can use QoS schedulers to maintain bandwidth and memory space allocation for a prefetch request.

Figure 20:
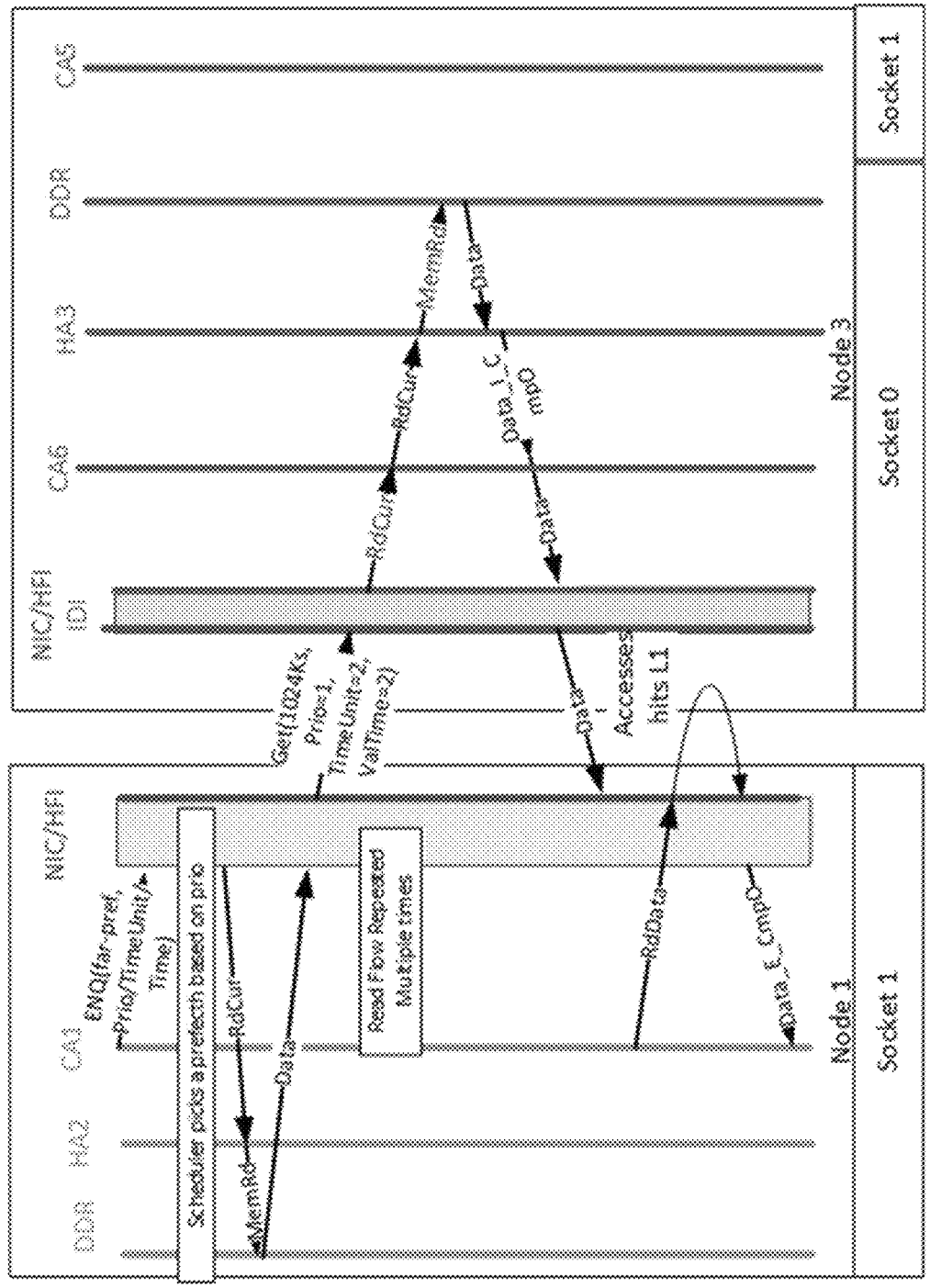
FIG. 20 depicts an example of prefetch flow.

FIG. 20 depicts an example of a prefetch flow. Caching agent (CA1) (e.g., an application or device) issues a prefetch request with priority, time unit, and time of completion to NIC/HFI. CA1 can send a prefetch command to the NIC/HFI to request the prefetch. NIC/HFI extracts a memory descriptor from the command that points to the local memory range where the far-prefetch data is stored.

NIC/HFI will enqueue the request in a new local queue (or multiple queues) that contain the pending requests and the associated priority. Each request has a priority (NONE, 1, . . . n) and can be allocated to a queue associated with its priority. NIC/HFI uses a scheduler to prioritize performance among all the pending requests according to the priority. Requests are dropped if the time that the request has been allocated is higher than the provided time of validity of the request (if provided).

NIC/HFI scheduler issues a read (RdCur) to local memory (DDR) via host fabric adapter (HA2) to determine if the local memory stores the prefetched content. In this example, local memory stores some of the content requested to be prefetched and local memory provides data to the NIC/HFI where it can be stored until copied to a cache (e.g., L1 or L2) of CA1.

In addition, or alternatively, NIC/HFI reads from local memory the given memory line and extracts the virtual address, the number of lines to be fetched from remote memory and the node id to where the far-prefetch needs to be send.

A prefetch transaction is denied if the specified size is bigger than a value configured through registers (e.g., model specific registers (MSRs)) and configured at boot time. In case that the maximum payload per get message supported by the fabric is smaller than the amount of requested pre-fetch the NIC/HFI will generate the amount of gets required to fulfill the request.

NIC/HFI will reserve entries in the corresponding buffers in order to guarantee that when prefetch data is returned, data has the required resources to reach L1 or L2 of the computing platform. In the case that the prefetch is not dropped, the resources in the fabric and remote node that the request is traversing will reserve entries in buffers of any of the intermediate buffers in the end-to-end path to attempt to provide that when prefetch data is sent to the requester HFI/NIC, data has the required resources to be stored in the L1 or L2 in a timely manner.

NIC/HFI generates one or more get messages to the remote node to retrieve the content that needs to be prefetched from remote memory to the memory or cache of the NIC/HFI or one or more memory tiers of a computing platform. Local NIC/HFI can issue one or more get messages to remote NIC/HFI Inter-device interconnect (IDI). A get message can provide an indicator that the current get is a prefetch read to remote memory as well as related parameters (e.g., priority, time of validity, time units). Parameters can be used by a remote HFI (e.g., network device's QoS scheduler) to apply quality of service to improve system utilization (e.g., upgrade or downgrade priority of this type of read) or reject the transaction (e.g., HFI is overloaded and processing the pre-fetch would harm performance of existing regular reads). Note that despite some of the get messages failing, a partial prefetch can be still be valid to prefetch as much content as possible given available resources.

Based on one or more get commands, NIC/HFI generates one or more read messages (RdCur) to host adapter HA3 and cache agent CA5 with a memory read (MemRd) to memory (e.g., DDR). Remote memory provides content (data) as a response through HA3 and CA6 to the NIC/HFI. A response or data received from the remote memory is stored in the cache of the NIC/HFI or in a memory tier or cache of a computing platform.

The response from the remote memory's HFI can be a NACK (e.g., there is resource contention in the target HFI or the resource is unavailable to the requester (e.g., security violation, lack of permission)). In this scenario, the software stack will learn using existing mechanisms that the prefetch command failed. The NIC/HFI could notify the software stack using a software interrupt that the far-prefetch failed.

In the computing platform, CA1 issues RdData to copy prefetched data from the NIC/HFI cache or memory to L1 or L2 cache. When the application issues the actual read to any of the pre-fetched lines, the read will likely achieve a hit in the memory cache (e.g., L1 or L2). A read will fail if lines have been evicted from the local cache or if far-prefetch failed.

In various embodiments, prefetched content can overflow to another tier of memory. For example, if there is insufficient space in a Tier 0 (e.g., LLC) for content (e.g., via eviction), content can be stored in Tier 1 memory (e.g., DDR or HBM) or Tier 2 memory (e.g., persistent memory or storage class memory). Likewise, if content is evicted from Tier 1 memory, it can be stored in Tier 2 memory.

Figure 21:
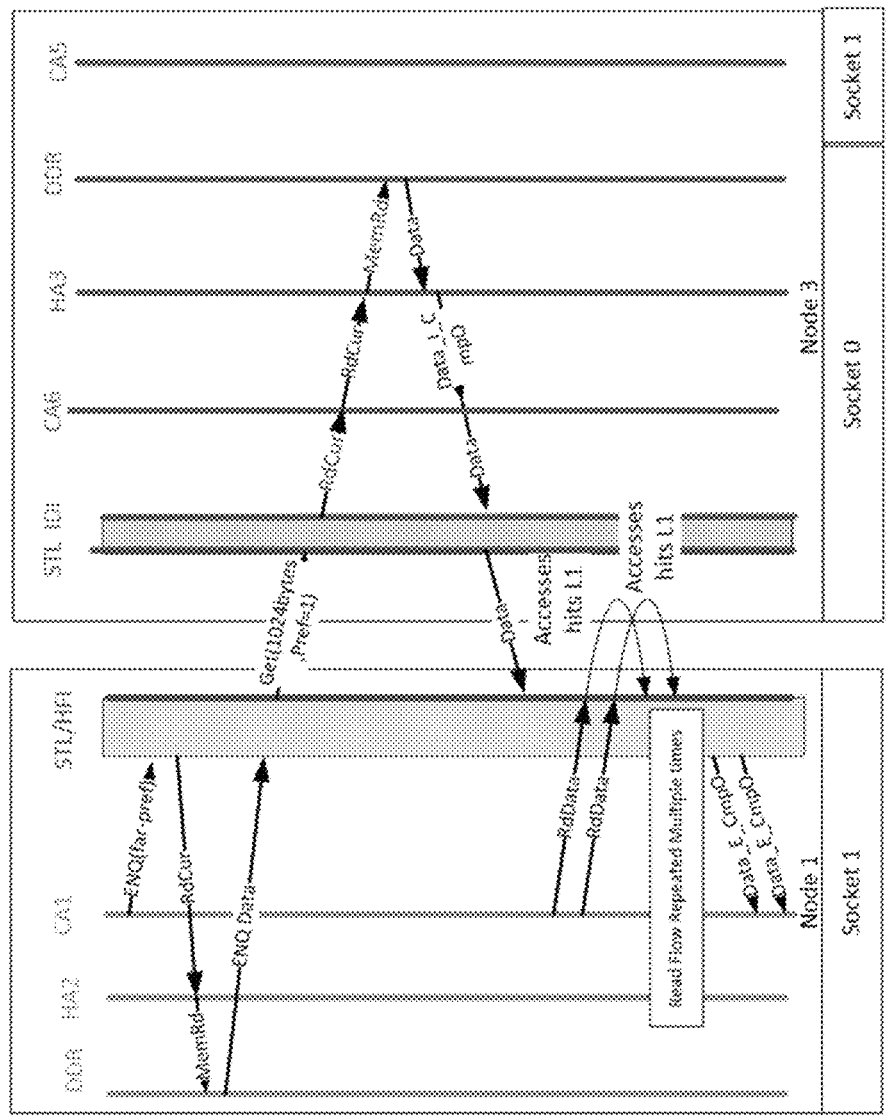
FIG. 21 depicts an example of a multi-line far prefetch where memory lines from a remote node to the local node using one single fabric far prefetch.

FIG. 21 depicts an example of a multi-line far prefetch where multiple memory lines from a remote node are prefetched to the local node's memory or cache (e.g., memory or cache of NIC/HFI or a memory tier of computing platform) using one single fabric far prefetch. Once the data actually needs the multiple memory lines, memory lines are already in the memory or cache of the HFI. RdData draws prefetched data to L1 or L2 cache.

Figure 22:
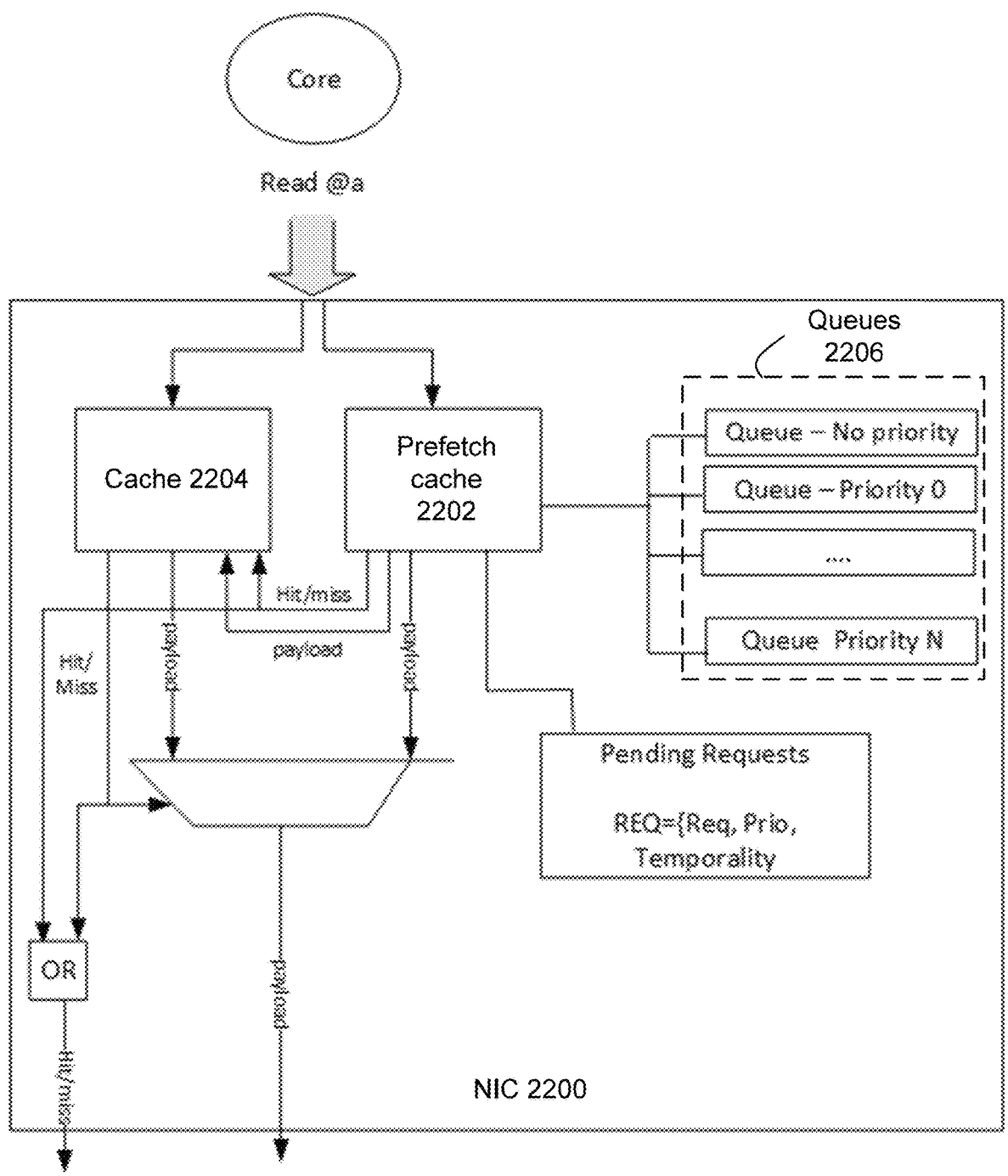
FIG. 22 depicts an example pre-fetch cache system.

FIG. 22 depicts an example pre-fetch cache system. The pre-fetch cache system can be used by a network interface 2200. To reduce pollution of the local cache in the network interface caused by the far-prefetch reads and other interactions with other existing regular gets/reads, various embodiments provide a read-only prefetch cache 2202 devoted to store read-only data from prefetch operations. A regular read (e.g., RdData) to copy content from the network interface 2200 to a L1 or L2 cache of a computing platform could copy content in parallel from both caches 2202 and 2204. In case of a hit to the pre-fetch cache, the content could be copied to the main network interface cache 2204 with the requested status (e.g., hit) and the content removed or invalidated from prefetch cache 2202. If a miss occurs, a miss indicator is provided to the requester. Data (payload) is provided to the computing platform (e.g., L1 or L2 cache) if there is a hit in either prefetch cache 2202 or cache 2204.

As shown, prefetch cache 2202 can be allocated to store content associated with various levels of priority-level requests. Queues 2206 can store various requests (e.g., prefetch requests, get requests, or push requests) and associated information. Queues 2206 can provide ordering of commands according to associated priority. In general, commands of higher priority can be executed before commands of lower priority. Execution of commands, prefetch requests, get requests, or push requests of the same priority level can be based on lower required time to completion or nearest in time to completion. Pending requests can be allocated to a queue prior to designation to a priority queue.

Figure 23:
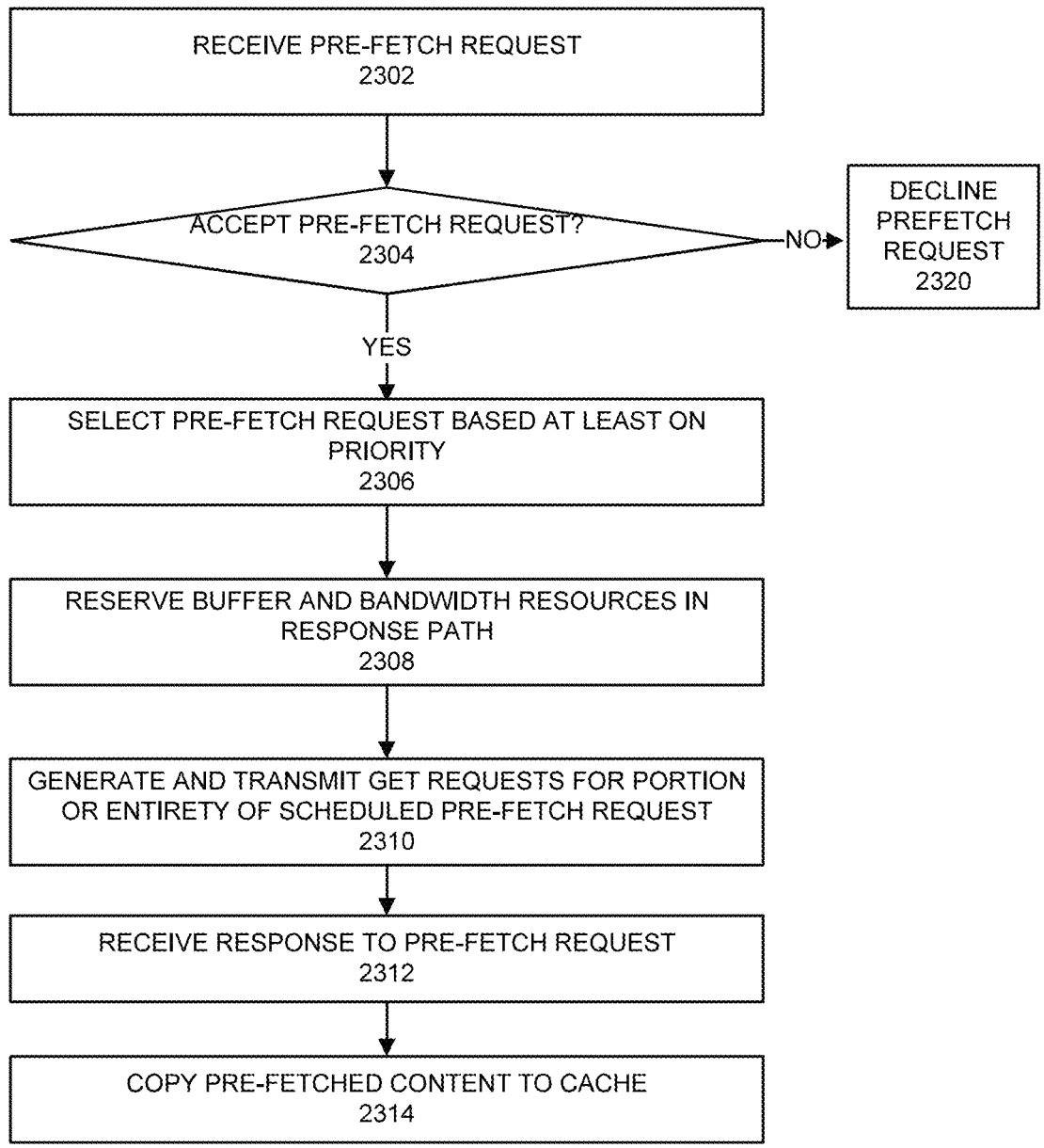
FIG. 23 depicts an example process that can be performed a network interface to request prefetch of content.

FIG. 23 depicts an example process that can be performed by a network interface to request prefetch of content. At 2302, a network interface receives a prefetch request. The prefetch request can refer to associated parameters. Associated parameters can one or more of: (1) base virtual address to be fetched from remote memory, (2) an integer indicating the amount of lines need to be fetched from remote memory, (3) the remote node storing the region to be fetched, (4) priority of the given prefetch associated with an application (process address ID (PASID)), (5) flag to indicate if resources (e.g., buffers in network interface, any network device, remote memory, remote storage) in the end-to-end path (from remote memory or storage to computing platform) are to be reserved for the transfer of content to network interface or memory tier(s) of computing platform, (6) a length of time of validity of the request and the length can be specified with a value that specifies the amount of time and units of the amount of time. The time of validity can be a time or timer at which data is needed in an L1 or L2 cache of the computing platform for processing or access (using units specified for the amount of time) or another memory tier (e.g. LLC, DRAM, or HBM) of the computing platform or in a cache or memory of a network interface.

At 2304, a determination is made whether to accept a prefetch request or decline a prefetch request. For example, a determination can be made of a resources needed to perform the prefetch request within the time limit (e.g., copy of specified content in a remote memory to a local memory tier or memory of a network interface or to a L1 or L2 cache within the time limit). A prefetch can be accepted if the prefetch request can be completed within the prescribed time limit because bandwidth and intermediate buffer and destination memory resources are available for use such that the time limit can be met. If the prefetch request cannot be met within the time limit but any of the prefetch request can be met, then prefetch request can be modified to prefetch at least some content associated with the request within the time limit and the modified prefetch request is accepted. At 2320, the prefetch request can be denied because of reasons such as security issues or insufficient resources.

At 2306, selection of an available pre-fetch request can be made based at least on priority. For example, a priority indicator associated with a pre-fetch request can be used to determine a priority of a pre-fetch request. Higher priority requests can be selected over queued (and not in-process) lower priority pending requests. For requests of equal priority, a request with a lower time to completion can be selected.

At 2308, resource reservation can occur for bandwidth and memory resources in any network device in a response path (including the receiver computing platform's network interface) to achieve prefetch of content to local cache, memory or storage (e.g., within the computing platform and/or network interface's memory or cache). Resource reservation attempts to allocate bandwidth and memory resources to complete the prefetch within the time limit prescribed by the prefetch request.

At 2310, one or more get operations can be generated and transmitted for the selected prefetch request for content requested in the selected prefetch request or less content than the selected requested prefetch content. Address translation can be performed to determine a physical address associated with a memory region targeted by a pre-fetch operation. In some cases, a local memory can be inspected to determine if the content targeted by the scheduled pre-fetch operation is stored in the local memory or cache such as in a computing platform or the computing platform's network interface. In such case, get requests are generated and transmitted for the selected prefetch request that do not correspond to content stored locally (assuming content coherency) but for content stored remotely. However, get requests can be generated and transmitted for the selected prefetch request that corresponds to content stored locally.

At 2312, one or more responses to pre-fetch request can be received. The responses can include content retrieved from a remote memory device. The one or more responses can include data to be stored in a memory or cache of the computing platform that initiated the pre-fetch or a memory or cache of the computing platform's network interface. The network interface can manage storage of received responses to allocated memory or cache of the computing platform or memory or cache of the computing platform's network interface.

At 2314, copying of the prefetched content into a cache occurs prior to processing of the content. The cache can be L1 or L2 cache. An application or caching agent can request the copying. Accordingly, content can be available in L1 or L2 cache at a prescribed time using prefetching and resource reservation.

Figure 24:
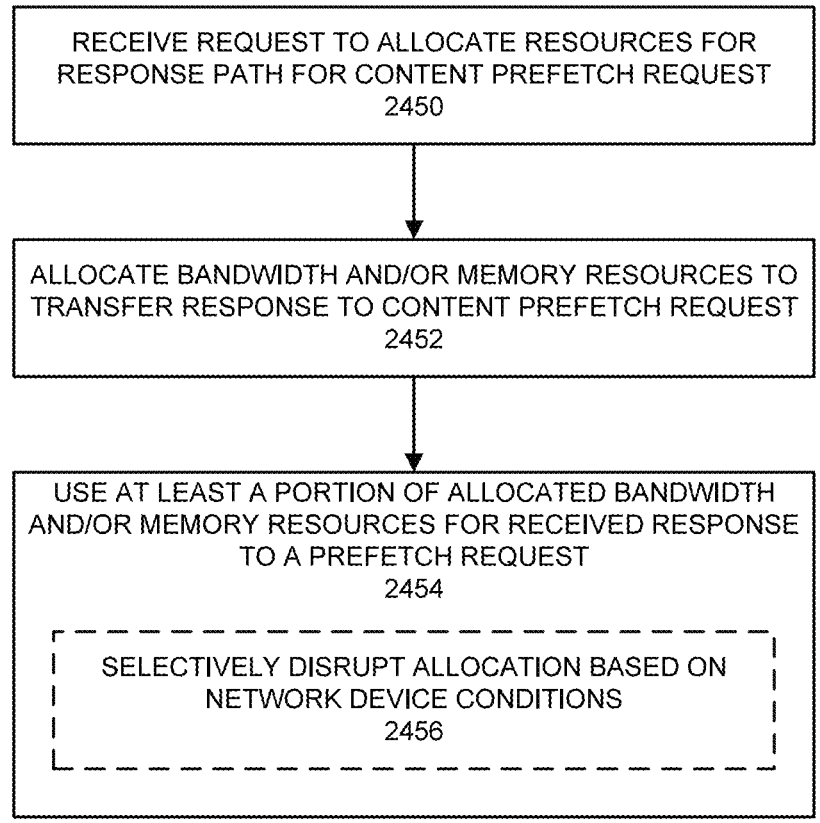
FIG. 24 depicts an example process.

FIG. 24 depicts an example process. The process can be performed by a network device that receives a request for prefetch and is to store and/or copy content as part of a response path to another node. For example, the process can be performed by any network device between a requesting computing platform and a remote memory.

At 2450, a request to allocate resources to response path for content prefetch operation is received. For example, resources can be output bandwidth, intermediate queue sizes, and cache, memory or storage space for storing content provided as a response to a prefetch request. A pod manager, orchestrator, hypervisor, virtual machine manager (VMM), or other device or software can provide for coordination of bandwidth and memory buffer space allocation along the response path from a remote memory to one or more receivers. For example, a receiver can be a cache or memory device of a source network interface used by a computing platform to request a prefetch from a remote memory. A receiver can in addition, or alternatively be a network device connected to the source network interface via a fabric or network and that provides memory or storage capability for storing prefetched data and that can supply prefetched content to the requester faster or sooner than can the remote memory.

At 2452, allocating specified resources at the network device for the prefetch response can take place. For example, the prefetch response can be associated with a prefetch identifier and priority level. Allocating resources can include allocating bandwidth or memory storage or memory bandwidth resources.

At 2454, a response is received and handled using resource allocation. The response can include a portion or entirety of content requested to be prefetched from remote memory. The request can be stored or transferred without storage to another network device. Based on the resource allocations made for the response and associated with a pre-fetch identifier, bandwidth or memory resources can be allocated for the response. At 2456, in some cases, quality of service-based adjustments can be applied which can disrupt allocated resources for the prefetch. For example, an upgrade or downgrade priority of a pre-fetch can occur or the transaction can be rejected by an overloaded network device. Accordingly, in some cases responses may not fulfill time requirements and can be terminated by an intermediary network device or an endpoint receiver of the content (e.g., the prefetch requester's network device).

To achieve close to peak efficiency (i.e., achieve high and steady instructions per cycle (IPC)), CPUs cannot stall while waiting for data to become available. In other words, data needed is to be in caches, or in local and upper tiers of memory, when a CPU is to process or access the data. The efficiency of CPUs drops not just from stalls for data, but also due to waiting for other CPUs in a collaborative computation (e.g., Map-Reduce, sequenced data processing, and so forth). However, as data volume increases, the hit rate in caches and in uppermost memory tier reduces, which can depend on how long-tailed the access distribution becomes. In some cases, the mean and 90th-percentile latency to obtain the data gets worse with growing miss rates potentially in the upper parts of the memory hierarchy.

Available bandwidth to outer tiers and to data in remote memory can drop approximately to an order of magnitude from L1/L2 cache accesses to accesses over a fabric, which causes latency to rise, from a few nanoseconds in L1/L2 to a microsecond or more for a remote access (e.g., through remote direct memory access (RDMA)). Even within a same node, data transfer rates can vary greatly. For example, a high bandwidth memory (HBM) tier may reach half a bandwidth of a terabyte per second (or more) whereas a persistent memory tier can currently reach a maximum bandwidth near a hundred gigabits/second (GB/s).

Prefetching data can reduce latency no matter where data is originally stored in local hierarchy, or in remote memory (e.g., in field programmable gate arrays (FPGAs), distributed shared memory (DSM), etcetera), or in pooled memory. However, prefetching data from memory to last level cache does not have an equivalent over the fabric. Usually data that is prefetched displaces other data, which creates a dilemma where a software must determine if it should displace useful data in processor caches with such prefetched data. Moreover, unused prefetched data can waste valuable cache space and increase wasted bus cycles and also introduce re-retrieval of prematurely displaced data from caches, which also uses bus cycles.

Data prefetches over fabric incur interconnect transactions that tie-up scarce resources such as various internal caches for mapping descriptors, trackers, etcetera, to data accesses, and queues/tables, which hold state for various request-response transactions.

Figure 25:
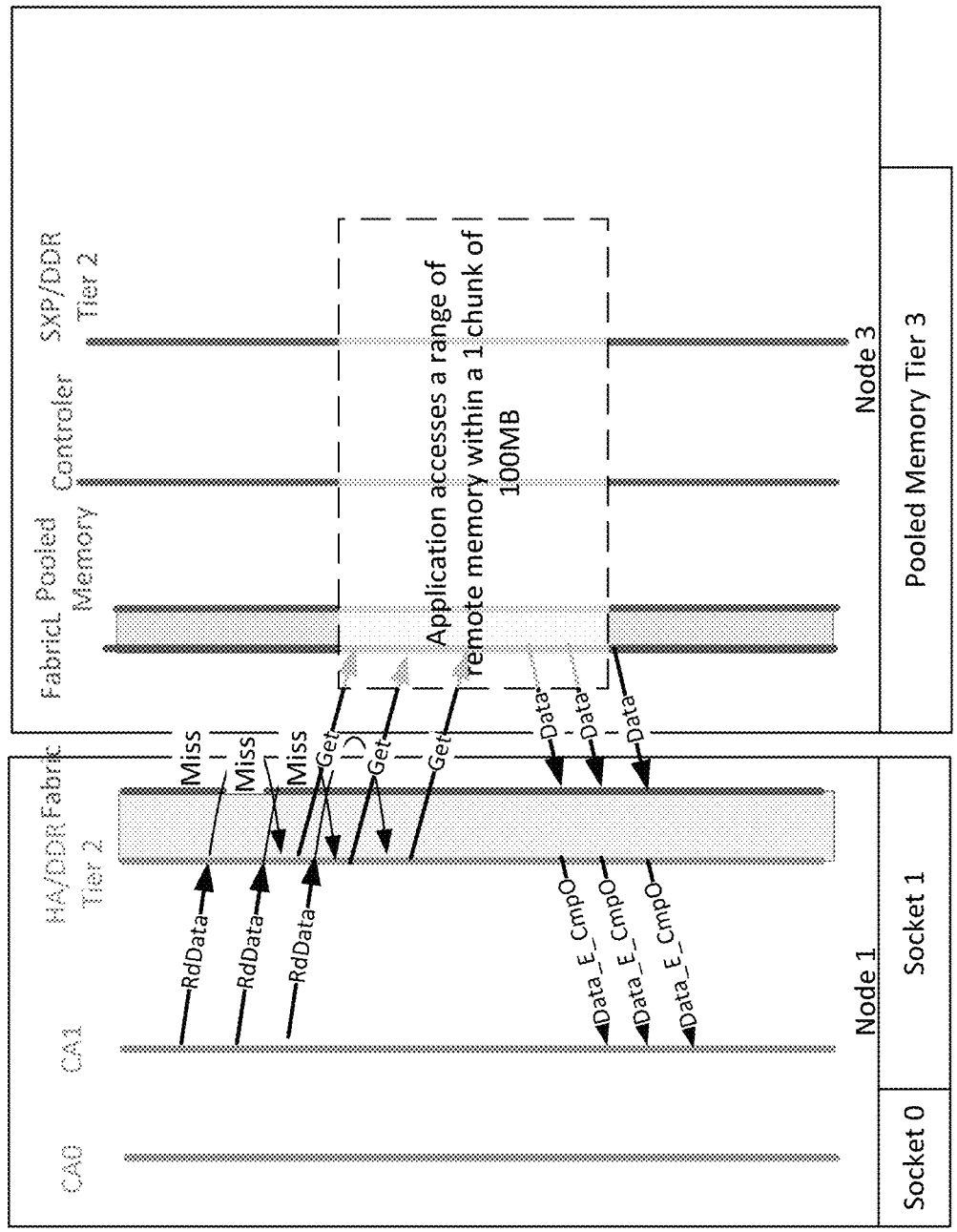
FIG. 25 depicts a scenario with multiple memory accesses.

In many situations, applications will not just read an occasional 64 bytes (e.g., 1 cache memory line) from remote nodes. For example, an application can scan several megabytes of data for the purpose of a data join. In scenarios where remote memory is being exposed by tunneling UPI over a fabric or interconnect such as PCI-e, Ethernet, Infini-Band, or other protocols, in current architectural approaches, applications will access such remote memory a cache line at a time in succession, as illustrated in FIG. 25. Even as fabric protocols support reading or writing different payload sizes, current UPI/IDI protocols only work at line granularity (e.g., 64 bytes), which can have implications in terms of latencies and fabric utilization. For example, to read 1024 bytes from remote memory, 16 reads are issued to remote memory, which can be impractical for streaming megabytes worth of data.

Moreover, the back-to-back cache line accesses shown in FIG. 25 may be optimistic. Cache line accesses can be spaced out if the CPU needs to perform some computations on the data that is coming in from the remote memory pool, and in the process of doing that, it is forced to wait before it can produce another request for another 64 byte memory line. Thus, the average load to use latency can be much greater than that suggested by FIG. 25.

To potentially improve prefetching schemes, various embodiments coordinate with platform and system quality of services in order to attempt to guarantee that enough platform and system (e.g., fabric, NIC) resources are available to drive the required data plane with the required service level agreement (SLA) for a data processing activity. A prefetching logic can automatically configure cache, memory and I/O quality of service for any prefetch of data from remote memory to local memory and cache in a computing platform or NIC. For example, a hardware or software prefetcher can copy 10 MB of data from remote memory so that 5 MB is stored in DDR, 4 MB is stored in HBM and 1 MB is stored in LLC and the memory and I/O quality of service is configured accordingly to make the data reach the destination memory tiers and achieve the applicable SLA.

Various embodiments permit software to provide parameters about portions of memory over which a demarcated code block or segment performs some operation (e.g., read, process, copy, put, get, load, store, and so forth), and expected accesses of memory regions proximate to the portions of memory (e.g., coarse prefetch) that are to be expected during the course of execution of the demarcated code block or segment. Moreover, software can specify time of data availability and priority of availability of any data for access or processing, whether or not the data is prefetched from a remote memory. Proactive prefetching (in some cases, including coarse prefetching) of data can take place over memory regions associated with demarcated code and proximate portions.

A prefetched data path of network devices can be managed to copy data from a remote memory to be closer to a higher performance tier of memory (e.g., L1 or L2 cache) nearer where an application or device is to access and process the data. The prefetched data path of network devices can adjust the rate of data copying to provide data in a timely manner by managing resources such as fabric bandwidth, memory allocated for data copying in the prefetched data path of network devices, local memory tiers, and caches. Different units of transfer can be applied at each network device in the path, with different durations for which the proactively prefetched data copies are allowed to remain stored (e.g., cached) at any stage so that the total latency is within applicable SLA requirements for the data. This collaboration among the network devices in the prefetched data path does not need to be intrusive on any part of the data path.

Various embodiments provide that the software that indicated data availability goals can offload monitoring and policy application in network devices in the path of the fetched data by which to guide how data is made available in a timely manner. The application can access and process the data and generate a result without managing data migration.

Figure 26A:
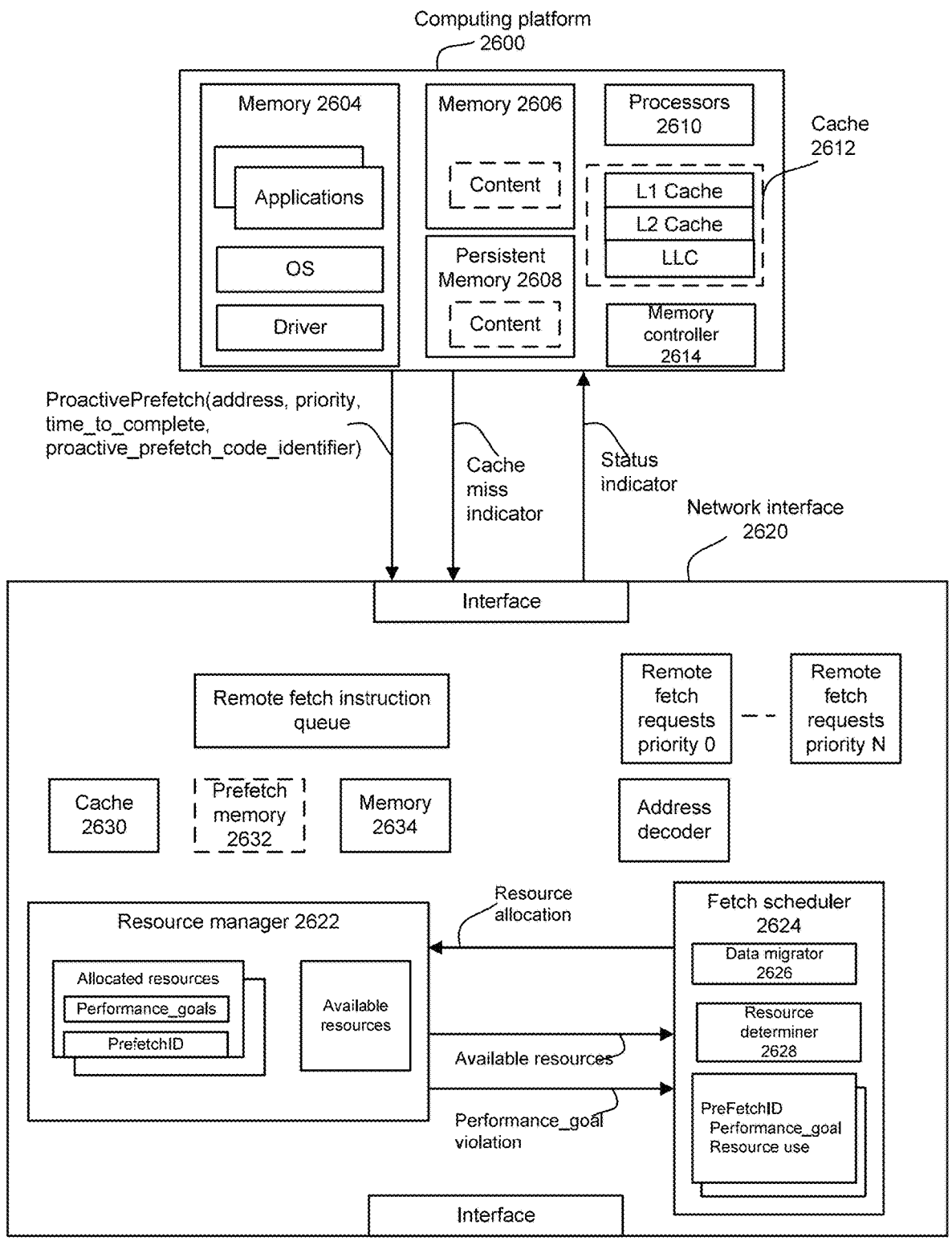
FIG. 26A provides a high level overview of a system.

FIG. 26A provides a high level overview of a system. Network interface 2620 can use a fetch scheduler 2624 and resource manager 2622 to manage timing and resources used to prefetch content from a remote memory or storage to one or multiple blocks from a pooled or remote memory to any of the local memory tiers (e.g., cache 2612, memory 2604 (e.g., DDR and/or HBM), memory 2606 (e.g., DDR and/or HBM or persistent memory 2608) or cache 2630, prefetch memory 2632, or memory 2634 of network interface 2620.

In some examples, software (e.g., application or OS) explicitly requests a prefetch operation. A software interface can allow applications to program fetch scheduler of network interface. For example, software can use an application program interface (API) such as ProactivePrefetch(address, priority, time_to_complete, proactive_prefetch_code_identifier). Field address can identify a range of starting and ending virtual memory addresses from which to prefetch data. Field priority can identify a priority of a proactive prefetch request. Field time_to_complete can indicate a timer (countdown) or time at which prefetched data is to be available in an L1 or L2 cache. Field proactive_prefetch_code_identifier can be a prefetch request identifier.

In some examples, a prefetch operation is not explicitly requested by software but inferred by fetch scheduler 2624. To identify memory regions of a particular memory hierarchy as regions to proactively prefetch, various embodiments use various approaches. An application developer (or compiler or library) can insert a wrapper or marker to identify any code segment or instructions that perform reads from or writes to a particular block(s) of cache lines. An application identifies interest in processing data blocks by use of tags identifying cache lines corresponding to the data blocks. Memory regions likely to be accessed by a marked code segment can be determined at least based on when memory allocation or regions specified when a marked code segment is compiled or executed. In addition, or alternatively, a monitoring device or processor-executed software in a particular memory tier memory controller can identify how particular regions of the next memory tier are being accessed and can identify those particular regions as candidates for proactive prefetching.

Network interface 2620 performs prefetches over the cache lines in a region identified for proactive prefetching so that back-to-back local-remote latency is hidden to the extent possible. The prefetching exposes interface to the software stack to specify temporal usage of the block. Thereby, when the prefetch is done for a chunk of data, not all data is stored in the cache or the nearest tier (e.g., DDR or HBM). Instead, data can be stored in different tiers (divided in sub-blocks) as the data comes from the remote memory (e.g., pooled memory) to the nearest memory tier.

In some examples, an application or device can issue a proactive prefetch request to a network interface 2620. When fetch scheduler 2624 used by network interface 2620 decides to prefetch one or multiple blocks from a pooled or remote memory to any of the local memory tiers, it will request resource manager 2622 to allocate resources to perform data copying from a remote memory within a prescribed time limit. For example, resources can include one or more of space in cache 2612, space in memory 2604 (e.g., DDR and/or HBM), space in memory 2606 (e.g., DDR and/or HBM), or space in persistent memory 2608) or space in cache 2630, space in prefetch memory 2632, or space in memory 2634, memory read or write bandwidth, and network interface 2620 receive bandwidth, and memory space, memory bandwidth, and network bandwidth available for copying of data along a data path from remote memory to a local memory tier.

Resource manager 2622 can track resources of network devices along a communication path between network interface 2620 and at least one remote memory or storage. Resources in multiple communication paths between network interface 2620 and at least one remote memory or storage can be identified so that multiple paths using network devices can be used for a response. Resource manager 2622 can advertise available resources to fetch scheduler 2624.

Fetch scheduler 2624 determines resources to use from available resources and whether any timing requirements for a prefetch or proactive prefetch can be met with available resources. Fetch scheduler 2624 can determine regions that are proactively prefetched based on memory associated with marked code described earlier with or addresses in memory associated with cache accesses. If timing requirements can be met for a prefetch or proactive prefetch, fetch scheduler can allocate resources to achieve at least some of prefetch or proactive prefetch. For example, based on an amount of data to prefetch or proactively prefetch, fetch scheduler 2624 can determine needed network device throughput bandwidth, memory bandwidth speed (e.g., speed at which data is read or written), needed space in memory or cache in any network device in a data path, and space in any local memory tier.

Fetch scheduler 2624 can choose an assortment of memory tiers to use to store prefetched or proactively prefetched content and use data migrator 2626 to manage copying/movement of content to a destination tier (including L1 or L2 cache) by the required time. For example, if some prefetched content is stored in persistent memory 2608 and some prefetched content is stored in memory 2606 due to vacancy, data migrator 2626 can schedule initiating copying of content to L2 cache based on latency profiles of memory 2606 and persistent memory 2608.

In an example, fetch scheduler 2624 specifies to resource manager 2622 what resources to use for a particular prefetch or proactive prefetch. For example, fetch scheduler 2624 can specify one or more of: a list of caches {C1, . . . , Cn}, memory tiers {M1, Mm} and Fabric Interfaces {F1, . . . , Ff}, a list of resource allocation for each of those resources {Res1, . . . , Resm+f+n}, an ID associated to that prefetching scheme (PASID+PrefID), and a time deadline for content to be copied to a local memory tier. In addition or alternatively, fetch scheduler 2624 can specify one or more of: a list of caches {C1, . . . , Cn}, memory tiers {M1, . . . , Mm} and fabric Interfaces {F1, . . . , Ff}, a list of resource allocation (utilization thresholds) for each of those resources {Thres1, . . . , Thresm+f+n}, an ID associated to that prefetching scheme (PASID+PrefID), and a time deadline for content to be copied to a local memory tier.

Resource manager 2622 is to reserve the amount of required resource for specified resources. Resource manager 2622 maps resource allocations to a PASID or list of PASIDS as it happens with other QoS flows. If there are not enough resources for a particular resource allocation, resource manager 2622 will return an error to prefetch scheduler and prefetch scheduler can determine what if any resources to allocate for a prefetch or proactive prefetch. If the resources can be allocated, resource manager 2622 returns an accept response to prefetch scheduler. Resource manager 2622 will monitor the utilization of those resources by a given prefetchID and trigger a callback to the prefetch scheduler if utilization of any allocated resources is violated (not met). Resource manager 2622 can communicate with a data path resource manager to learn bandwidth and memory space uses in network devices and also to allocate bandwidth and memory space in various network devices. Fetch scheduler 2624 can remove any requirements for resource use if responses to the prefetch are received or the prefetch failed due to violating timing requirement for data availability.

Fetch scheduler 2624 can use cache miss information (e.g., misses per kilo-instruction (MPKI)) to estimate a timing and locations of data for proactive prefetch from remote memory to memory tiers closer to the destination such as an intermediary network device memory or caches or local memory tiers. If MPKI levels begin to rise and meet or exceed a threshold, fetch scheduler 2624 can accelerate prefetching or proactive prefetching. For example, fetch scheduler 2624 can increase a bandwidth allocated for data transfer. Fetch scheduler 2624 can use data migrator 2626 to manage when data is to be copied from one device to another device. If MPKI levels begin to rise, fetch scheduler 2624 can cause copying operations to commence sooner. For example, data migrator 2626 can cause copying of data from a more distant tier of local memory (e.g., persistent memory) to a nearer tier of memory (e.g., HBM, DDR, or LLC). Data migrator 2626 can also manage copying of content from any local memory (including in network interface 2620) to L1 or L2 cache.

Fetch scheduler 2624 can use data migrator 2626 to orchestrate prefetches according to applicable SLAs and timing requirements. Data migrator 2626 can manage a prefetch of blocks or sub-blocks. Data migrator 2626 can compute when the data should be migrated from the source tier to the target tier (based on the consumption rate of the application accessing to data). Fetch scheduler 2624 can use resource determiner 2628 to compute resources used (per each block or sub-block to be moved) involved in the path from the source tier to the target tier. Resource determiner 2628 can compute the amount of resources needed to perform such data movement (e.g., LLC ways, DDR memory bandwidth and so forth).

If an SLA required for a particular resource is violated and a callback is received from resource manager 2622 or another source (e.g., orchestrator or hypervisor), resource determiner 2628 can re-allocate resources based on available resources. After a prefetch is completed to a local tier of memory or to L1 or L2 cache, resource manager 2622 will release the SLA and the allocated resources by communication with resource manager 2622.

In some examples, a CPU cache can avoid pollution by retaining proactively prefetched data in such regions for very short durations by treating proactively prefetched as least recently used-1 (LRU-1) and ready for quick demotion to a memory based staging/victim buffer. In addition, fabric controllers can aggregate proactive prefetch accesses over some chunk size.

Figure 26B:
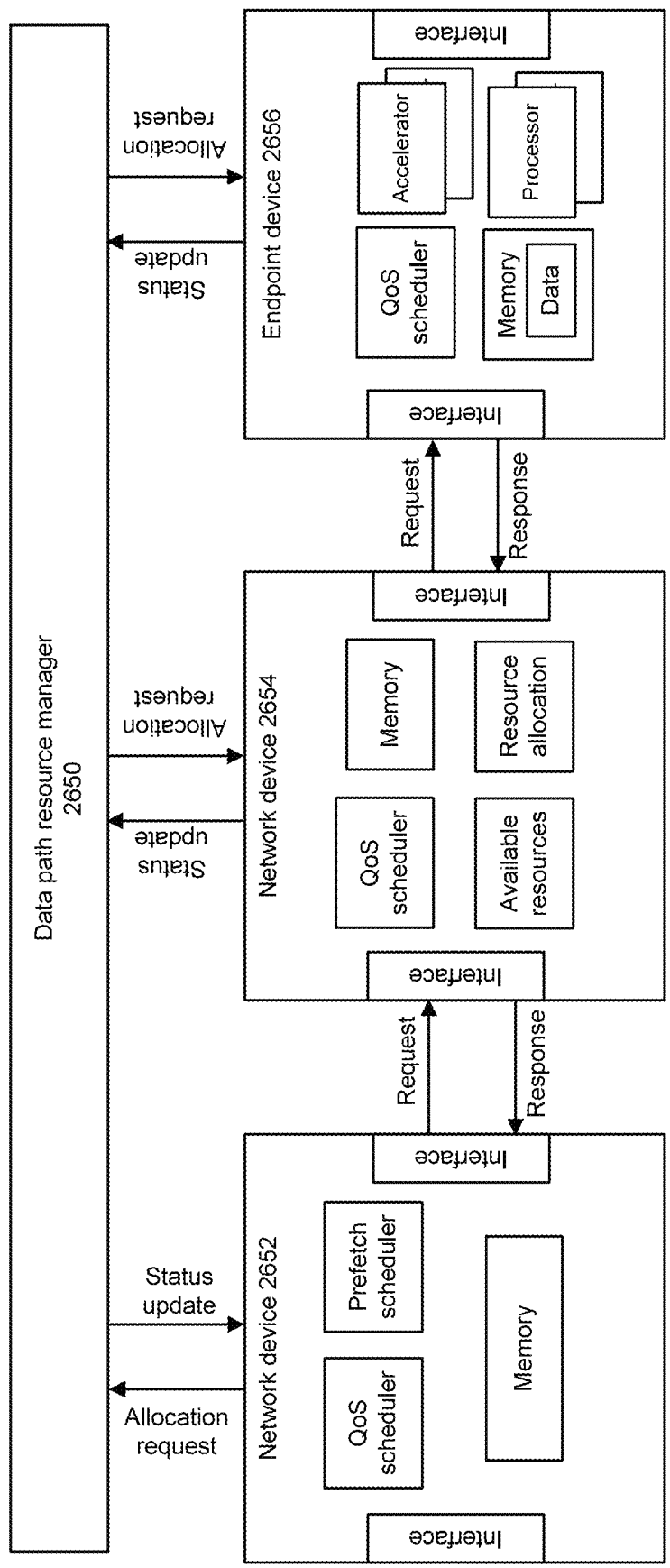
FIG. 26B depicts an example of devices communicating to reserve resources for prefetches and proactive prefetches.

FIG. 26B depicts an example of devices communicating to reserve resources for prefetches and proactive prefetches. Data path resource manager 2650 can be any of a pod manager, orchestrator, hypervisor, virtual machine manager (VMM), or other device manager. In a similar manner as described with respect to FIG. 19B, data path resource manager 2650 can identify resource availability and resource use of a network devices in a data transmit path from an endpoint device 2656 to requester's network device 2652. Endpoint device 2656 can provide any of accelerators, storage, or a memory pool. In this example, a requester can use endpoint device 2656 to prefetch content from endpoint device 2656 to a memory tier in a requester (e.g., LLC, DDR compatible memory, HBM, persistent memory) through network device 2654.

In some examples, network device 2654 tracks its own available resources and resource allocation for each fetchID. Network device 2654 can report any deviations from a resource allocation for a fetchID to data path resource manager 2650. For example, network device 2654 can modify resource allocation based on a variety of factors including device failure, a higher priority request needing and being granted allocated resources, and so forth.

Figure 27:
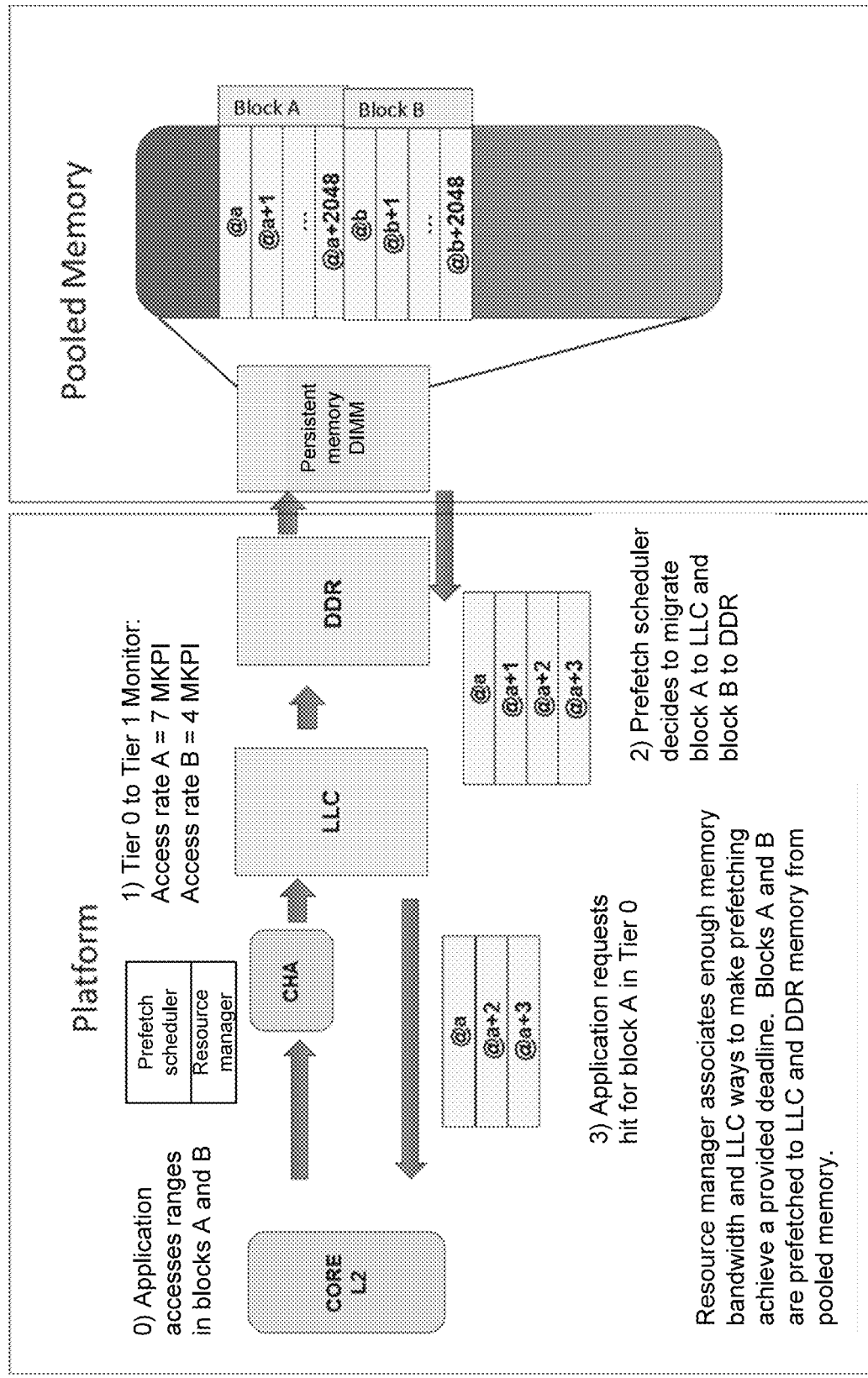
FIG. 27 depicts an example of prefetching of content in blocks A and B from pooled memory.

FIG. 27 depicts an example of prefetching of content in blocks A and B from a pooled memory remote to a platform. In this example, pooled memory can be a persistent memory (shown as Intel Optane® or byte-addressable persistent memory) such as byte address non-volatile memory or any type of memory. At 0), an application accesses ranges in blocks A and B in pooled memory. At 1), MPKI are detected for cache line misses for blocks A and B at respective 7 and 4 MPKI. Prefetch scheduler identifies that the MPKI level for blocks A and B exceed an MPKI level threshold. An MPKI threshold can be set per block (e.g., a MPKI threshold for block A and a different threshold for block B or one threshold for blocks A and B. At 2), prefetch scheduler migrates block A to LLC and block B to DDR. At 3), an application requests a hit for block A in tier 0 (LLC) and prefetch scheduler causes a copy of some of block A from LLC to L2 cache.

A Caching and Home Agent (CHA) available in some Intel multi-core CPU chips can be used to maintain cache coherency between cores and monitor requests for cache accesses. A CHA, or other device that is used instead of or in addition to a CHA, can be configured to perform one or more of: command queuing, meta data caching, a scoreboard to track data retrieval and query execution progress, a hashing operation, a comparator operation, a masking operation, and a result queue.

Figure 28:
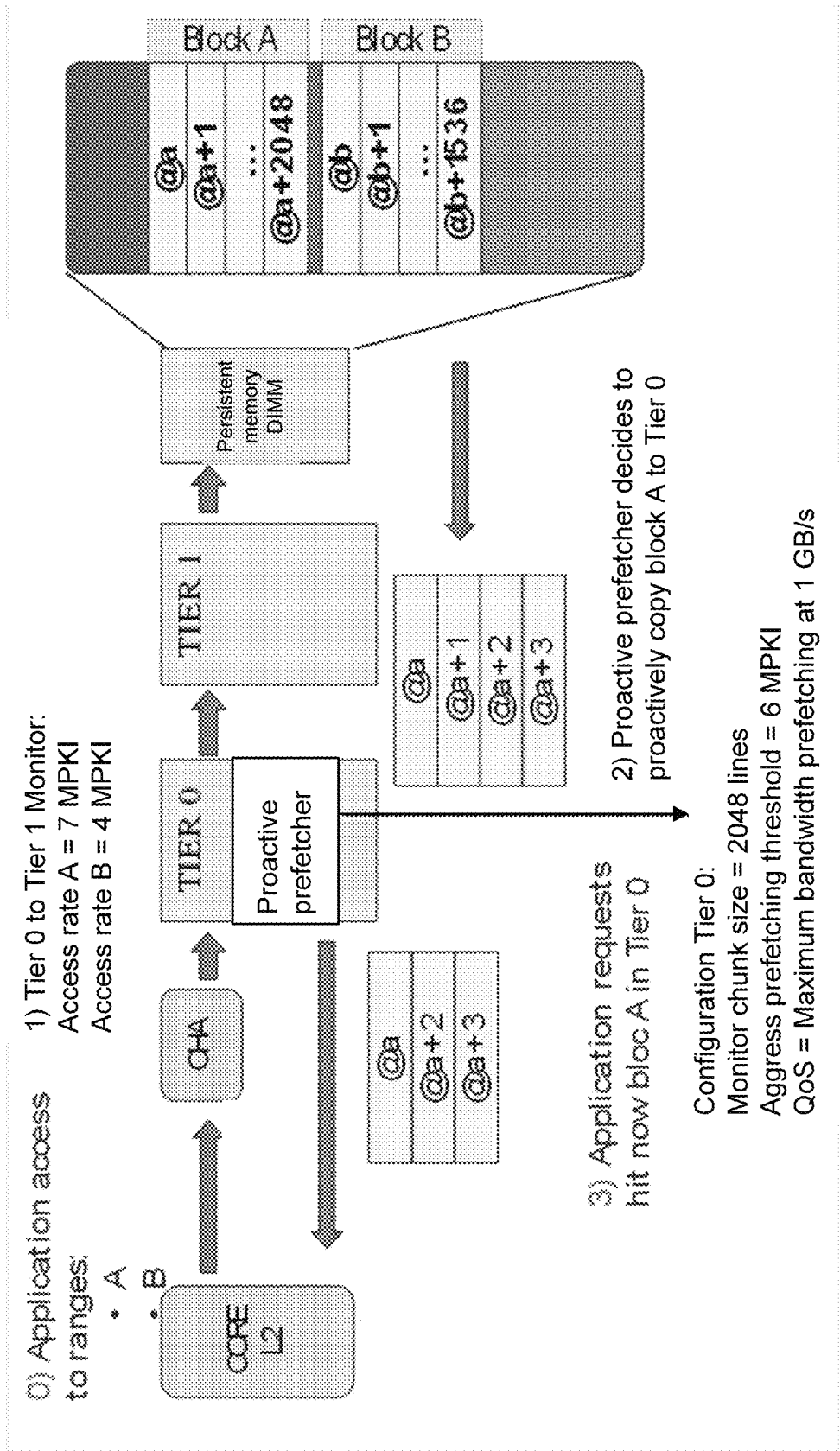
FIG. 28 shows an example of a proactive prefetch operation.

FIG. 28 shows an example of a proactive prefetch operation. A wrapper or marker can identify code that will perform reads or writes to a particular block(s) of cache lines (and associated addresses in memory). In this example, a system has 3 tiers of memory (e.g., Tier 0 (e.g., LLC), Tier 1 (e.g., DDR or HBM compatible memory), and persistent memory). At action 0, an application identifies interest in processing data blocks in ranges of memory addresses of blocks A and B by use of tags identifying cache lines that are to be used corresponding to ranges of memory addresses A and B. These indications pass from the CPU to proactive prefetcher which has a configuration for the range of chunk size at which to monitor accesses. Proactive prefetcher can be used by a network interface to monitor cache line misses and cause proactive prefetch of regions of memory to tiers of memory nearer to L1 or L2 cache (e.g., Tier 0 and/or Tier 1). For example, proactive prefetcher can include or use components of a fetch scheduler and resource manager and vice versa.

An application configures the proactive prefetcher to monitor an MPKI level of cache accesses that correspond to memory ranges in any of blocks A and B. Proactive prefetcher is configured to detect a threshold MPKI level that exceeds 6 MPKI and cause proactive prefetching as a result. Other threshold MPKI levels can be used. An MPKI level of 7 for block A causes action 2, where proactive prefetcher begins to proactively prefetch block A to Tier 0 into a transparent buffer (as a side cache). An increment of fetched content can be 256-bytes, 512-bytes, or other sizes. The transparent buffer can be allocated in Tier 0 memory (e.g., LLC) and is maintained by proactive prefetcher. Subsequently, as the application's requests hit lines in block A (e.g., offsets 0, 2, and 3), at action 3, proactive prefetcher causes copying of lines in block A (e.g., offsets 0, 2, and 3) from Tier 0 from the side cache to the L2 cache. Lines at offsets 0, 2, and 3 in block A can be available to be overwritten or evicted from Tier 0.

Proactive prefetcher also monitors actual accesses in regions A or B and adjusts the amount of data to bring into the side cache accordingly such as how many megabytes or any other volume metric. For instance, if access is high to block A, proactive prefetcher may start prefetching 10 MB of content or if access to block A is low, proactive prefetcher may prefetch only 1 MB. Note that capacity management of the side cache can be kept simple. For example, a cuckoo hash of a small chain length may suffice for each range.

Figure 29:
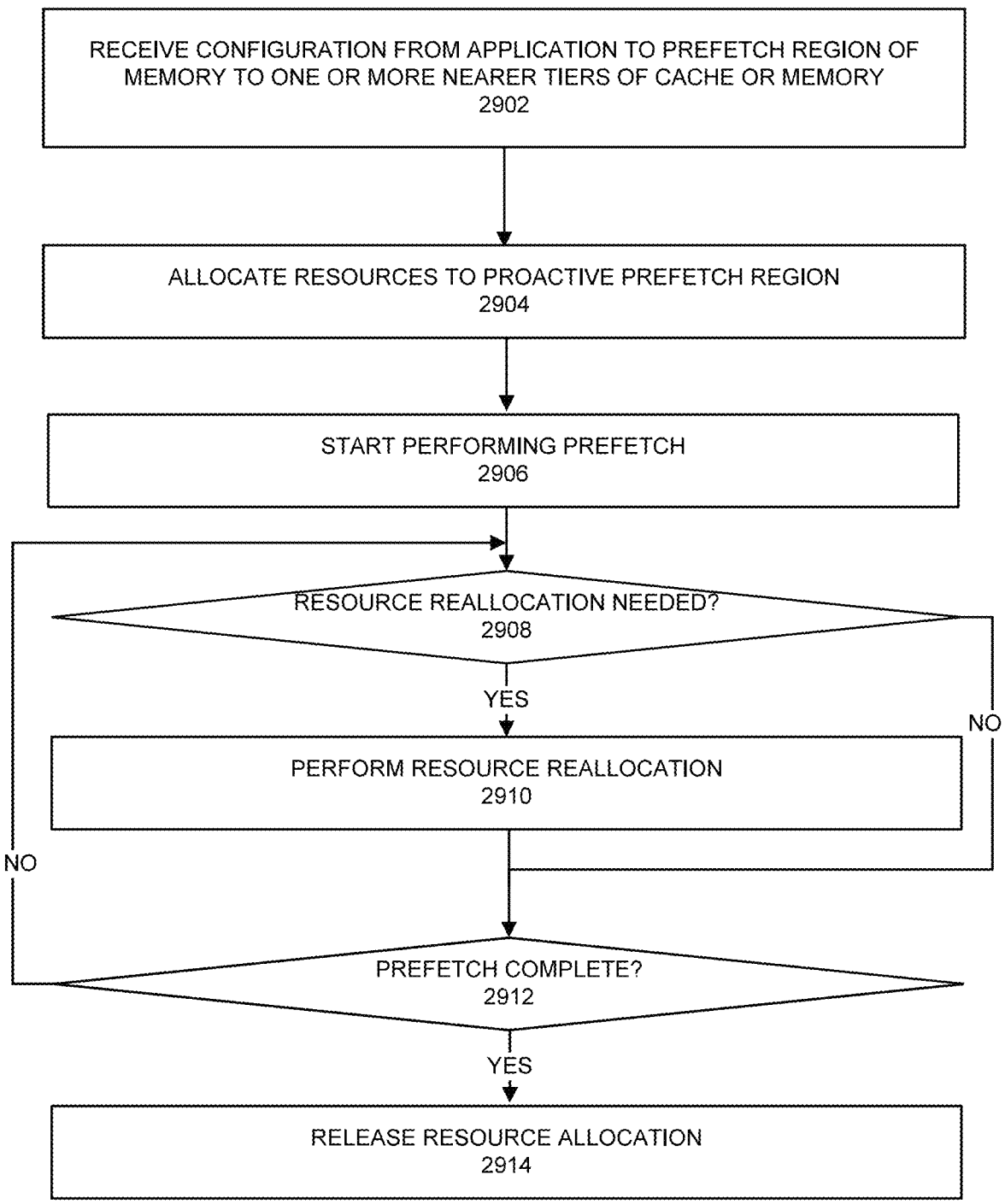
FIG. 29 depicts a process.

FIG. 29 depicts a process. The process can be performed by a network interface to allocate resources for a prefetch or proactive prefetch of content from remote memory or storage to a memory or cache of a platform or network interface. At 2902, a configuration is received from an application, software or device. Configuration can include one or more of: a range of starting and ending virtual memory addresses from which to prefetch data; priority of a proactive prefetch request; a timer (countdown) or time at which prefetched data is to be available in an L1 or L2 cache; or a prefetch request identifier. In some examples, an application identifies interest in processing data blocks by use of tags identifying cache lines corresponding to the data blocks. Memory regions likely to be accessed by a marked code segment can be determined at least based on when memory allocation or regions specified when a marked code segment is compiled or executed.

At 2904, resources are allocated for the proactive prefetch of region. A region can be smaller, same size or larger than a region identified by application. A determination is made of an amount of resources needed to perform such data movement (e.g., LLC ways, memory bandwidth, network device bandwidth, and so forth). In some cases, allocation of resources for as much of the prefetch as can be met for the time requirements can be made so that less than an entire amount of content is to be prefetched. For example, if insufficient resources are available to meet the time requirements, an amount of resources are allocated that correspond to copying of less than an entire content associated with the prefetch request. However, if all of the content can be copied for the prefetch and meet the time requirements based on the available resources, the amount of resources determined for prefetching the content is allocated.

At 2906, performance of the prefetch is started. Content is copied and moved to memory tiers nearer to L1 or L2 cache or to L1 or L2 cache within a prescribed time limit. Intermediary network devices can use allocated resources to copy or store the content along the path to the destination.

At 2908, a determination is made if resource reallocation is to occur for the prefetch. For example, if an MPKI level rises for any of proactive prefetched block, amount of content prefetches can be increased or accelerated and resources allocated to handle the increased or accelerated prefetches. For example, if the SLA required for a particular resource is violated, hence a callback is received, resource reallocation can be attempted. If resource re-allocation is to take place, 2910 follows. If resource re-allocation is not to occur, 2912 follows.

At 2910, resource reallocation is performed. Resource reallocation can be performed in a similar manner as that of 2904 such that resources are attempted to be allocated for an entire content region prefetch but resources can be allocated for less than the entire content region subject to available resources and time transfer requirements.

At 2912, a determination is made if a prefetch is complete. If the prefetch is complete, 2914 follows where resources can be deallocated and released for other uses. If the prefetch is not complete, the process returns to 2908.

Accordingly, data can be available in tiers nearer to L1 or L2 cache or to L1 or L2 cache prior to when needed for processing. Proactive prefetch of a larger region that requested and accelerating requests can help with data availability nearer to L1 or L2 cache. This can reduce idle CPU time.

Figure 30:
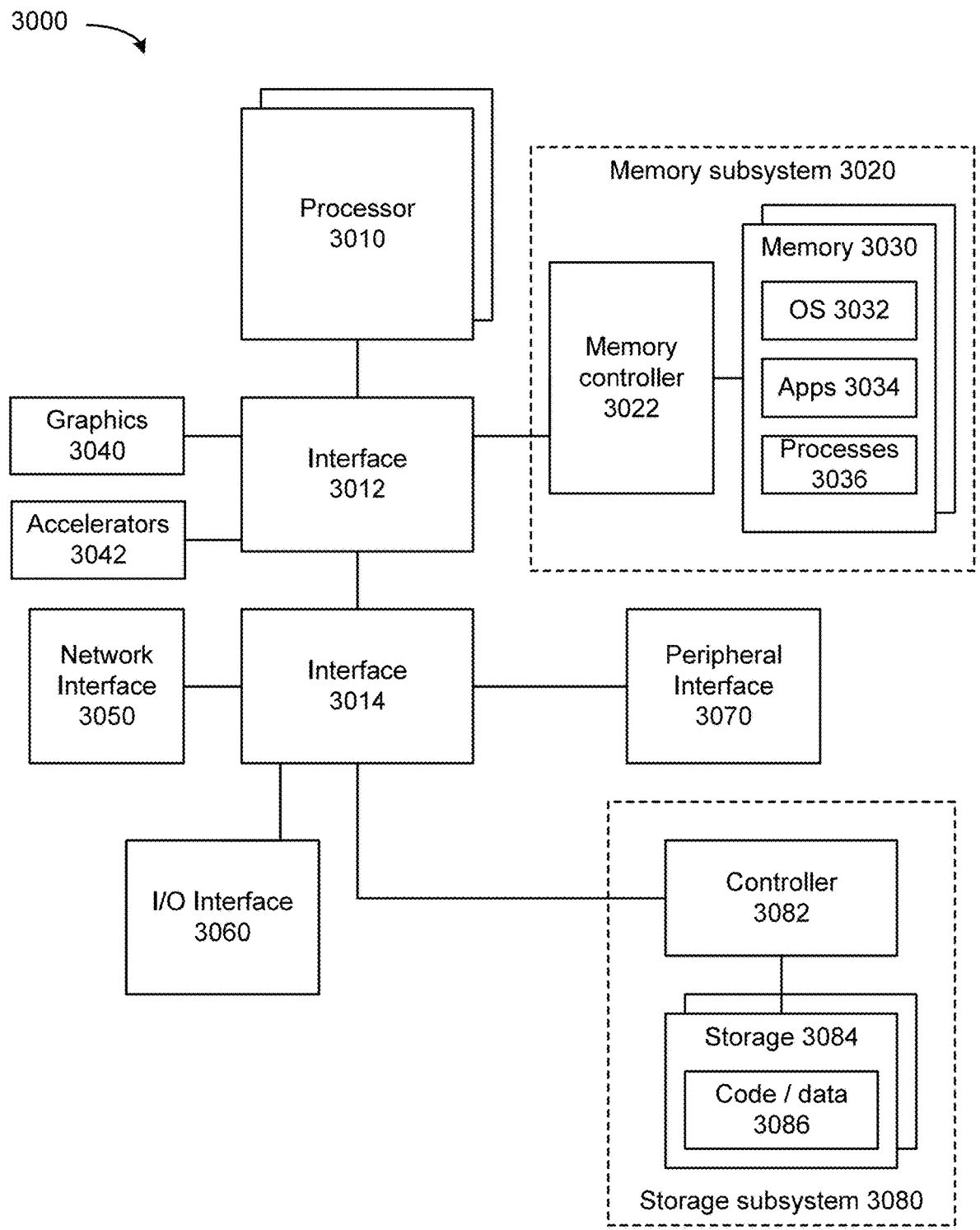
FIG. 30 depicts a system.

FIG. 30 depicts a system. System 3000 includes processor 3010, which provides processing, operation management, and execution of instructions for system 3000. Processor 3010 can include any type of microprocessor, central processing unit (CPU), graphics processing unit (GPU), processing core, or other processing hardware to provide processing for system 3000, or a combination of processors. Processor 3010 controls the overall operation of system 3000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 3000 includes interface 3012 coupled to processor 3010, which can represent a higher speed interface or a high throughput interface for system components that needs higher bandwidth connections, such as memory subsystem 3020 or graphics interface components 3040, or accelerators 3042. Interface 3012 represents an interface circuit, which can be a standalone component or integrated onto a processor die. Where present, graphics interface 3040 interfaces to graphics components for providing a visual display to a user of system 3000. In one example, graphics interface 3040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 3040 generates a display based on data stored in memory 3030 or based on operations executed by processor 3010 or both. In one example, graphics interface 3040 generates a display based on data stored in memory 3030 or based on operations executed by processor 3010 or both.

Accelerators 3042 can be a fixed function offload engine that can be accessed or used by a processor 3010. For example, an accelerator among accelerators 3042 can provide compression (DC) capability, cryptography services such as public key encryption (PKE), cipher, hash/authentication capabilities, decryption, or other capabilities or services. In some embodiments, in addition or alternatively, an accelerator among accelerators 3042 provides field select controller capabilities as described herein. In some cases, accelerators 3042 can be integrated into a CPU socket (e.g., a connector to a motherboard or circuit board that includes a CPU and provides an electrical interface with the CPU). For example, accelerators 3042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 3042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 3020 represents the main memory of system 3000 and provides storage for code to be executed by processor 3010, or data values to be used in executing a routine. Memory subsystem 3020 can include one or more memory devices 3030 such as read-only memory (ROM), flash memory, one or more varieties of random access memory (RAM) such as DRAM, or other memory devices, or a combination of such devices. Memory 3030 stores and hosts, among other things, operating system (OS) 3032 to provide a software platform for execution of instructions in system 3000. Additionally, applications 3034 can execute on the software platform of OS 3032 from memory 3030. Applications 3034 and OS 3032 can be executed within a virtual machine environment or container environment with distinct allocated memory regions. Applications 3034 represent programs that have their own operational logic to perform execution of one or more functions. Processes 3036 represent agents or routines that provide auxiliary functions to OS 3032 or one or more applications 3034 or a combination. OS 3032, applications 3034, and processes 3036 provide software logic to provide functions for system 3000. In one example, memory subsystem 3020 includes memory controller 3022, which is a memory controller to generate and issue commands to memory 3030. It will be understood that memory controller 3022 could be a physical part of processor 3010 or a physical part of interface 3012. For example, memory controller 3022 can be an integrated memory controller, integrated onto a circuit with processor 3010.

While not specifically illustrated, it will be understood that system 3000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 3000 includes interface 3014, which can be coupled to interface 3012. In one example, interface 3014 represents an interface circuit, which can include standalone components and integrated circuitry. In one example, multiple user interface components or peripheral components, or both, couple to interface 3014. Network interface 3050 provides system 3000 the ability to communicate with remote devices (e.g., servers or other computing devices) over one or more networks. Network interface 3050 can include an Ethernet adapter, wireless interconnection components, cellular network interconnection components, USB (universal serial bus), or other wired or wireless standards-based or proprietary interfaces. Network interface 3050 can transmit data to a device that is in the same data center or rack or a remote device, which can include sending data stored in memory. Network interface 3050 can receive data from a remote device, which can include storing received data into memory. Various embodiments can be used in connection with network interface 3050, processor 3010, and memory subsystem 3020.

In one example, system 3000 includes one or more input/output (I/O) interface(s) 3060. I/O interface 3060 can include one or more interface components through which a user interacts with system 3000 (e.g., audio, alphanumeric, tactile/touch, or other interfacing). Peripheral interface 3070 can include any hardware interface not specifically mentioned above. Peripherals refer generally to devices that connect dependently to system 3000. A dependent connection is one where system 3000 provides the software platform or hardware platform or both on which operation executes, and with which a user interacts.

In one example, system 3000 includes storage subsystem 3080 to store data in a nonvolatile manner. In one example, in certain system implementations, at least certain components of storage 3080 can overlap with components of memory subsystem 3020. Storage subsystem 3080 includes storage device(s) 3084, which can be or include any conventional medium for storing large amounts of data in a nonvolatile manner, such as one or more magnetic, solid state, or optical based disks, or a combination. Storage 3084 holds code or instructions and data 3086 in a persistent state (i.e., the value is retained despite interruption of power to system 3000). Storage 3084 can be generically considered to be a "memory," although memory 3030 is typically the executing or operating memory to provide instructions to processor 3010. Whereas storage 3084 is nonvolatile, memory 3030 can include volatile memory (i.e., the value or state of the data is indeterminate if power is interrupted to system 3000). In one example, storage subsystem 3080 includes controller 3082 to interface with storage 3084. In one example controller 3082 is a physical part of interface 3014 or processor 3010 or can include circuits or logic in both processor 3010 and interface 3014.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 3000. More specifically, power source typically interfaces to one or multiple power supplies in system 3000 to provide power to the components of system 3000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 3000 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a network interface comprising: a memory; an interface to a communications medium; and a prefetcher communicatively coupled to the interface and to receive a command to perform a prefetch of content from a remote memory with associated information, wherein the associated information comprises a time limit and the prefetcher to determine whether a resource allocation is available to complete at least a portion of the prefetch within the time limit based on the command and associated information.

Example 2 includes any example, wherein the associated information includes one or more of: (1) base virtual address to be fetched from remote memory, (2) amount of content to be fetched from remote memory, (3) the remote memory storing a region to be fetched, (4) priority of prefetch, (5) indication if resources in an end-to-end path are to be reserved for a response, or (6) a length of time of validity of the prefetch and unit of time.

Example 3 includes any example, wherein the prefetcher is to cause copying of content from the remote memory to one or more memory tiers including level 1 cache, level 2 cache, last level cache, local memory, persistent memory, or memory of the network interface.

Example 4 includes any example, wherein the prefetcher is to reserve resources in any network device in a pre-fetch data path between the network interface and the remote memory.

Example 5 includes any example, wherein the resources comprise one or more of: memory bandwidth, egress bandwidth, or memory space can be allocated for any network device for use with a prefetch.

Example 6 includes any example, wherein the prefetcher is to determine an amount of resources for allocation to perform a content copying and determine when content is to be copied from the remote memory to a target memory tier based on the allocated resources.

Example 7 includes any example, wherein the prefetcher is to determine another allocation of resources based on resource allocation not meeting determined resource allocation.

Example 8 includes any example, and including a cache and a read-only cache to store pre-fetched data from the remote memory.

Example 9 includes any example, wherein the prefetcher is to: request to prefetch a region within the time limit; determine a region of memory in the remote memory to proactively prefetch associated with the prefetch; and allocate bandwidth and memory space in data path to migrate data in the determined region of memory within the time limit.

Example 10 includes any example, wherein the prefetcher is to cause content to be copied to a cache within the time limit.

Example 11 includes any example, wherein the prefetcher is to: determine a rate of cache misses associated with a region of memory identified as to be prefetched from the remote memory and based on the rate of cache misses increasing and exceeding a threshold level, increase a rate of copy of data from the remote memory to a local memory tier.

Example 12 includes any example, and including a resource manager to manage resource allocation in any network device in a data path from the remote memory to a local memory tier based on allocated resources.

Example 13 includes any example, wherein the prefetcher is to cause a pre-push of content to the remote memory from a local memory tier.

Example 14 includes any example, and including one or more of: a server, data center, rack, or computing platform.

Example 15 includes any example, and including the remote memory.

Example 16 includes a computer-implemented method comprising: receiving a request to prefetch content from a remote memory; associating a larger region of the remote memory than a region associated with the request with a proactive prefetch; allocating resources in a data path from the remote memory to one or more local tiers of memory for proactive prefetching of the larger region; causing a start of prefetching of the larger region; and based on a cache miss level for cache accesses associated with the larger region meeting or exceeding a threshold, causing an increased rate of prefetching of the larger region to the one or more local tiers of memory.

Example 17 includes any example, wherein the associating a larger region of remote memory with a proactive prefetch is based on a marker of executed code identifying a larger region of memory.

Example 18 includes any example, wherein the resources comprise one or more of: memory bandwidth, egress bandwidth, or memory space can be allocated for any network device in a data path of prefetched content.

Example 19 includes any example, wherein the request has associated information including one or more of: (1) base virtual address to be fetched from remote memory, (2) amount of content to be fetched from remote memory, (3) the remote memory storing the region to be fetched, (4) priority of prefetch, (5) indication if resources in an end-to-end path are to be reserved for a response, or (6) a time to complete content transfer.

Example 20 includes any example, wherein the allocating resources in a data path from the remote memory to one or more local tiers of memory for proactive prefetching of the region comprises allocating resources in a data path from the remote memory to one or more local tiers of memory for proactive prefetching of the region based on a time to complete content transfer.

Example 21 includes any example, wherein the one or more local tiers of memory include level 1 cache, level 2 cache, last level cache, local memory, persistent memory, or the memory of a network interface.

Example 22 includes any example, and including: receiving a request to push content to a remote memory; allocating resources in a data path to the remote memory; and causing a start of pushing of content to the remote memory.

What is claimed is:
1. A network interface comprising:
a memory;
an interface to a communications medium;
a prefetcher communicatively coupled to the interface and to receive a command to perform a prefetch of content from a remote memory with associated information, wherein the associated information comprises a time limit and the prefetcher to determine whether a resource allocation is available to complete at least a portion of the prefetch within the time limit based on the command and associated information; and
the prefetcher determines a rate of cache misses associated with a region of memory identified as to be prefetched from the remote memory and based on the rate of cache misses increasing and exceeding a threshold level, increase a rate of copy of data from the remote memory to a local memory tier.

2. The network interface of claim 1, wherein the associated information includes one or more of:
(1) base virtual address to be fetched from remote memory, (2) amount of content to be fetched from remote memory, (3) the remote memory storing a region to be fetched, (4) priority of prefetch, (5) indication if resources in an end-to-end path are to be reserved for a response, or (6) a length of time of validity of the prefetch and unit of time.

3. The network interface of claim 1, wherein the prefetcher is to cause copying of content from the remote memory to one or more memory tiers including level 1 cache, level 2 cache, last level cache, local memory, persistent memory, or memory of the network interface.

4. The network interface of claim 1, wherein the prefetcher is to reserve resources in any network device in a pre-fetch data path between the network interface and the remote memory.

5. The network interface of claim 4, wherein the resources comprise one or more of:
memory bandwidth, egress bandwidth, or memory space can be allocated for any network device for use with a prefetch.

6. The network interface of claim 4, wherein the prefetcher is to determine an amount of resources for allocation to perform a content copying and determine when content is to be copied from the remote memory to a target memory tier based on the allocated resources.

7. The network interface of claim 6, wherein the prefetcher is to determine another allocation of resources based on resource allocation not meeting determined resource allocation.

8. The network interface of claim 1, comprising a cache and a read-only cache to store pre-fetched data from the remote memory.

9. The network interface of claim 1, wherein the prefetcher is to:
request to prefetch a region within the time limit;
determine a region of memory in the remote memory to proactively prefetch associated with the prefetch; and
allocate bandwidth and memory space in data path to migrate data in the determined region of memory within the time limit.

10. The network interface of claim 1, wherein the prefetcher is to cause content to be copied to a cache within the time limit.

11. The network interface of claim 1, comprising a resource manager to manage resource allocation in any network device in a data path from the remote memory to a local memory tier based on allocated resources.

12. The network interface of claim 1, wherein the prefetcher is to cause a pre-push of content to the remote memory from a local memory tier.

13. The network interface of claim 1, comprising one or more of:
a server, data center, rack, or computing platform.

14. The network interface of claim 1, comprising the remote memory.

15. A computer-implemented method comprising:
receiving a request to prefetch content from a remote memory;
associating a larger region of the remote memory than a region associated with the request with a proactive prefetch;
allocating resources in a data path from the remote memory to one or more local tiers of memory for proactive prefetching of the larger region;
causing a start of prefetching of the larger region; and
based on a cache miss level for cache accesses associated with the larger region meeting or exceeding a threshold, causing an increased rate of prefetching of the larger region to the one or more local tiers of memory.

16. The method of claim 15, wherein the associating a larger region of remote memory with a proactive prefetch is based on a marker of executed code identifying a larger region of memory.

17. The method of claim 15, wherein the resources comprise one or more of:
memory bandwidth, egress bandwidth, or memory space can be allocated for any network device in a data path of prefetched content.

18. The method of claim 15, wherein the request has associated information including one or more of:
(1) base virtual address to be fetched from remote memory, (2) amount of content to be fetched from remote memory, (3) the remote memory storing the region to be fetched, (4) priority of prefetch, (5) indication if resources in an end-to-end path are to be reserved for a response, or (6) a time to complete content transfer.

19. The method of claim 18, wherein the allocating resources in a data path from the remote memory to one or more local tiers of memory for proactive prefetching of the region comprises allocating resources in a data path from the remote memory to one or more local tiers of memory for proactive prefetching of the region based on a time to complete content transfer.

20. The method of claim 15, wherein the one or more local tiers of memory include level 1 cache, level 2 cache, last level cache, local memory, persistent memory, or the memory of a network interface.

21. The method of claim 15, comprising:
receiving a request to push content to a remote memory;
allocating resources in a data path to the remote memory; and
causing a start of pushing of content to the remote memory.

* * * * *